（12）United States Patent
Motoyama

(10) Patent No.: US 11,860,640 B2
(45) Date of Patent: Jan. 2, 2024

(54) SIGNAL PROCESSING DEVICE AND SIGNAL PROCESSING METHOD, PROGRAM, AND MOBILE BODY

(71) Applicant: Sony Corporation, Tokyo (JP)

(72) Inventor: Takuto Motoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 482 days.

(21) Appl. No.: 16/982,590

(22) PCT Filed: Mar. 15, 2019

(86) PCT No.: PCT/JP2019/010757
§ 371 (c)(1),
(2) Date: Sep. 21, 2020

(87) PCT Pub. No.: WO2019/188389
PCT Pub. Date: Oct. 3, 2019

(65) Prior Publication Data
US 2021/0019536 A1      Jan. 21, 2021

(30) Foreign Application Priority Data
Mar. 29, 2018    (JP) ................................. 2018-063530

(51) Int. Cl.
*G05D 1/02*       (2020.01)
*B60W 60/00*      (2020.01)
(Continued)

(52) U.S. Cl.
CPC ....... *G05D 1/0246* (2013.01); *B60W 30/0956* (2013.01); *B60W 60/001* (2020.02);
(Continued)

(58) Field of Classification Search
CPC ...... G06V 20/588; G06V 10/44; G06V 20/58; G06V 20/41; B60W 30/0956;
(Continued)

(56) References Cited

U.S. PATENT DOCUMENTS

2017/0084038 A1*   3/2017   Dane ....................... G06T 7/507
2017/0220877 A1*   8/2017   Kakegawa ............. G08G 1/166
(Continued)

FOREIGN PATENT DOCUMENTS

| JP | 2016-045891 A | 4/2016 |
| WO | 2017/048383 A1 | 3/2017 |
| WO | 2017/098709 A1 | 6/2017 |

OTHER PUBLICATIONS

International Search Report and Written Opinion dated Jun. 18, 2019 for PCT/JP2019/010757 filed on Mar. 15, 2019, 11 pages including English Translation of the International Search Report.
(Continued)

*Primary Examiner* — Donald J Wallace
(74) *Attorney, Agent, or Firm* — XSENSUS LLP

(57) ABSTRACT

On the basis of semantic labeling information in an image captured by a camera an area in which a boundary of a movable area of a mobile body exists in the image is estimated as an image movable area boundary, on the basis of a distance image detected by a depth sensor an area in which the boundary of the movable area of the mobile body exists in the distance image is estimated as a distance image movable area boundary, the boundary of the movable area is determined on the basis of the image movable area boundary and of the distance image movable area boundary, and an environment map is generated on the basis of the determined boundary of the movable area. The present disclosure can be applied to an in-vehicle system.

15 Claims, 18 Drawing Sheets

(51) Int. Cl.
*G01C 21/00* (2006.01)
*B60W 30/095* (2012.01)
*G01C 21/34* (2006.01)
*G05D 1/00* (2006.01)
*G06V 20/56* (2022.01)
*G06V 10/44* (2022.01)
*G06V 20/58* (2022.01)

(52) U.S. Cl.
CPC ..... *G01C 21/3461* (2013.01); *G01C 21/3807* (2020.08); *G05D 1/0088* (2013.01); *G05D 1/0214* (2013.01); *G06V 10/44* (2022.01); *G06V 20/58* (2022.01); *G06V 20/588* (2022.01); *B60W 2420/42* (2013.01)

(58) Field of Classification Search
CPC ............ B60W 60/001; B60W 2420/42; G01C 21/3461; G01C 21/3807; G01C 21/206; G01C 21/3811; G01C 21/383; G01C 21/3837; G01C 21/3852; G05D 1/0088; G05D 1/0214; G05D 2201/0213; G05D 1/0274; G05D 1/0246; G05D 1/021; G06T 7/00; G06T 7/13; G06T 3/4007; G06T 7/187; G06T 7/521
See application file for complete search history.

(56) References Cited

U.S. PATENT DOCUMENTS

2018/0247148 A1\* 8/2018 Saitou ....................... G06T 7/11
2018/0259621 A1\* 9/2018 Yamazaki ............ H04N 13/246
2019/0286153 A1\* 9/2019 Rankawat ............ G05D 1/0246

OTHER PUBLICATIONS

Qiu, Y., et al., "Study of Life Space Sensing and Functional Analysis Using RGB-D Camera," The 23rd Symposium on Sensing via Image Information, SSII2017 [USB], S02-IS2-21, Dec. 31, 2017.

\* cited by examiner

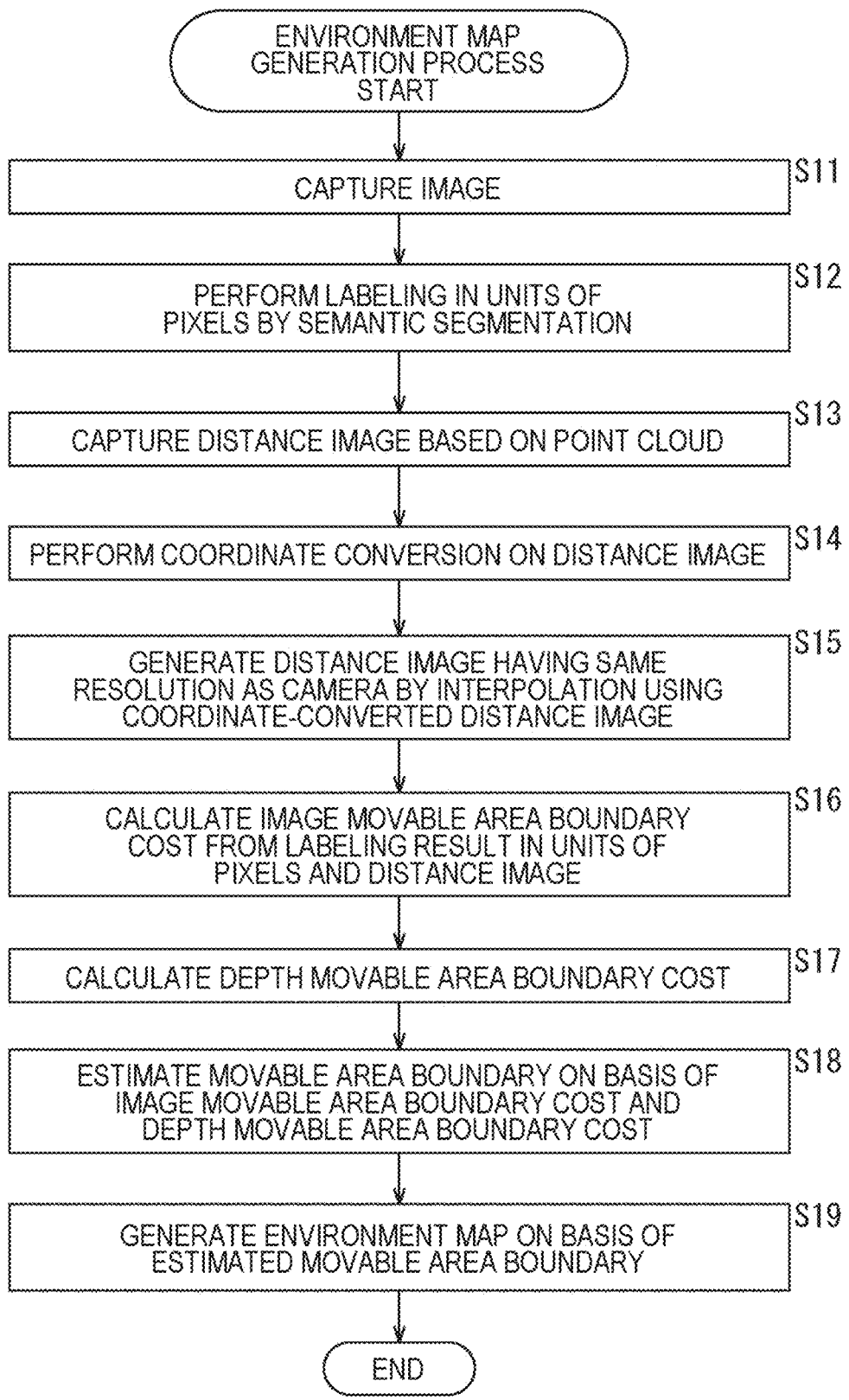

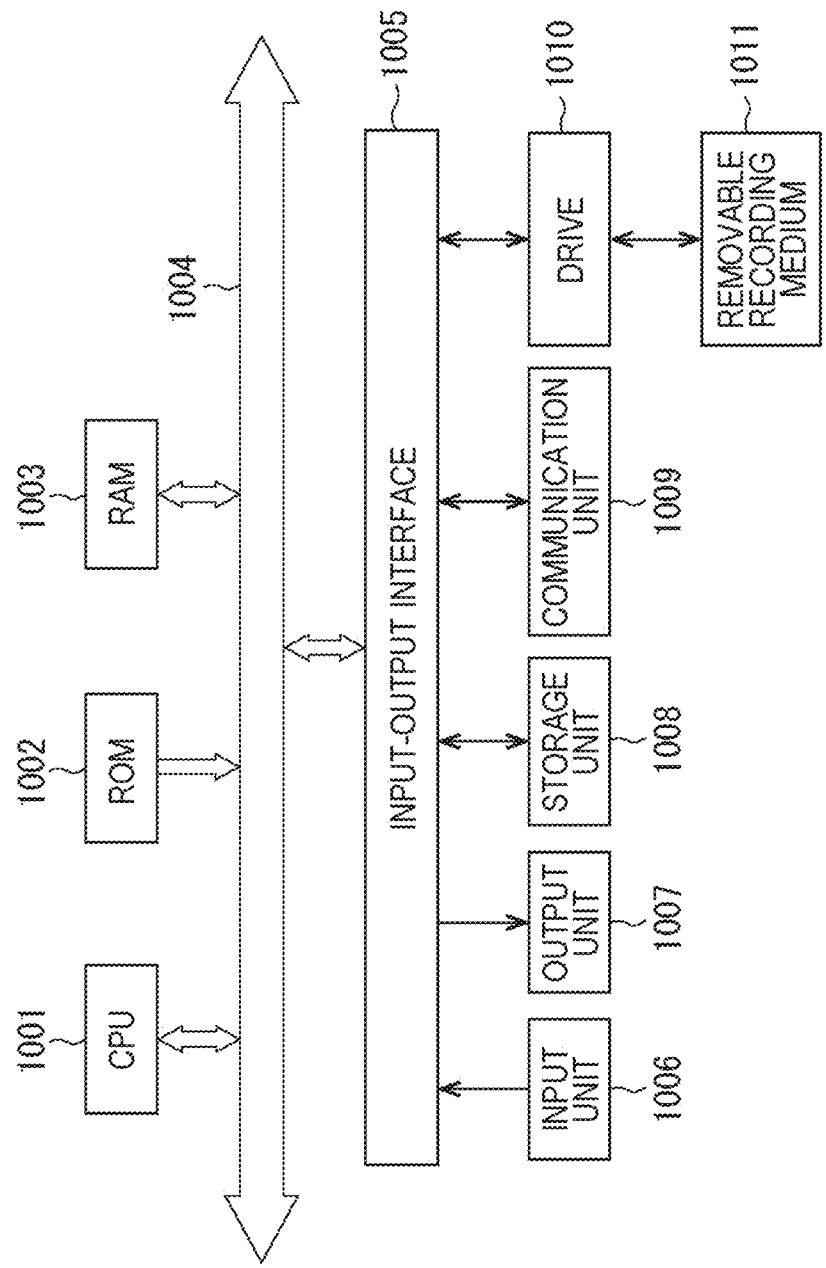

SIGNAL PROCESSING DEVICE AND SIGNAL PROCESSING METHOD, PROGRAM, AND MOBILE BODY

CROSS-REFERENCE TO RELATED APPLICATIONS

The present application is based on PCT filing PCT/JP2019/010757, filed Mar. 15, 2019, which claims priority to JP 2018-063530, filed Mar. 29, 2018, the entire contents of each are incorporated herein by reference.

TECHNICAL FIELD

The present disclosure relates to a signal processing device and a signal processing method, a program, and a mobile body, and in particular, a signal processing device and a signal processing method, a program, and a mobile body capable of detecting a movable area of the mobile body with high accuracy.

BACKGROUND ART

Various techniques for causing a mobile body such as a vehicle or a robot to move autonomously have been proposed.

When causing a mobile body to autonomously move, a movable area is detected from an image of the moving direction of the mobile body captured by a camera or the like, a local map such as an occupancy grid map is generated on the basis of information of the detected movable area, and movement is planned.

As a technique to detect the movable area, a technique has been proposed to estimate a road surface boundary (travelable area) using point cloud information (3D point cloud information) by a laser radar (including LiDAR) and an image captured by a camera (See Patent Document 1).

More specifically, a three-dimensional structure is determined on the basis of height information in the point cloud information of the laser radar, so as to generate the occupancy grid map. Furthermore, edges extending in a vanishing point direction are extracted on the basis of the image captured by the camera. Then, the boundary of the travelable area of the occupancy grid map is compared with the image edge, and an edge to be a road surface boundary at the foot of the three-dimensional object is extracted. The movable area is detected on the basis of the road surface boundary including the edges thus obtained.

CITATION LIST

Patent Document

Patent Document 1: Japanese Patent Application Laid-Open No. 2014-006588

SUMMARY OF THE INVENTION

Problems to be Solved by the Invention

However, the edge detection based on the image captured by the camera according to the technique of Patent Document 1 is easily disturbed by shadows, noise, and the like, and also the occupancy grid map due to false points of the laser radar is also easily affected by noise.

The present disclosure has been made in view of such circumstances, and particularly to detect the boundary of a movable area of a mobile body with high accuracy.

Solutions to Problems

A signal processing device according to one aspect of the present disclosure includes a labeling boundary estimation unit that estimates as a labeling information boundary, on the basis of labeling information according to a type of a subject in a captured image, an area in which a boundary of a movable area of a mobile body exists in the image, a distance image boundary estimation unit that estimates as a distance image boundary, on the basis of a distance image, an area in which the boundary of the movable area exists in the distance image, and a movable area boundary determination unit that determines the boundary of the movable area on the basis of the labeling information boundary and of the distance image boundary. A signal processing method according to one aspect of the present disclosure includes a labeling boundary estimation process of estimating as a labeling information boundary, on the basis of labeling information according to a type of a subject in a captured image, an area in which a boundary of a movable area of a mobile body exists in the image, a distance image boundary estimation process of estimating as a distance image boundary, on the basis of a distance image, an area in which the boundary of the movable area exists in the distance image, and a movable area boundary determination process of determining the boundary of the movable area on the basis of the labeling information boundary and of the distance image boundary.

A program according to one aspect of the present disclosure is a program that causes a computer to function as a labeling boundary estimation unit that estimates as a labeling information boundary, on the basis of labeling information according to a type of a subject in a captured image, an area in which a boundary of a movable area of a mobile body exists in the image, a distance image boundary estimation unit that estimates as a distance image boundary, on the basis of a distance image, an area in which the boundary of the movable area exists in the distance image, and a movable area boundary determination unit that determines the boundary of the movable area on the basis of the labeling information boundary and of the distance image boundary.

A mobile body according to one aspect of the present disclosure includes a labeling boundary estimation unit that estimates as a labeling information boundary, on the basis of labeling information according to a type of a subject in a captured image, an area in which a boundary of a movable area of a mobile body exists in the image, a distance image boundary estimation unit that estimates as a distance image boundary, on the basis of a distance image, an area in which the boundary of the movable area exists in the distance image, a movable area boundary determination unit that determines the boundary of the movable area on the basis of the labeling information boundary and of the distance image boundary, an environment mapping unit that generates an environment map on the basis of the boundary of the movable area determined by the movable area boundary determination unit, a planning unit that generates an action plan on the basis of the environment map, and a control unit that controls the operation of the mobile body on the basis of the generated action plan.

In one aspect of the present disclosure, on the basis of labeling information according to a type of a subject in a captured image an area in which a boundary of a movable area of a mobile body exists in the image is estimated as a labeling information boundary, on the basis of a distance image an area in which the boundary of the movable area exists in the distance image is estimated as a distance image boundary, and the boundary of the movable area is determined on the basis of the labeling information boundary and of the distance image boundary.

Effects of the Invention

According to one aspect of the present disclosure, it is possible to detect the boundary of a movable area of a mobile body with high accuracy.

BRIEF DESCRIPTION OF DRAWINGS

FIG. 17 is a flowchart describing an environment map generation process.

FIG. 18 is a diagram describing a configuration example of a general-purpose computer.

MODE FOR CARRYING OUT THE INVENTION

Figure 1:
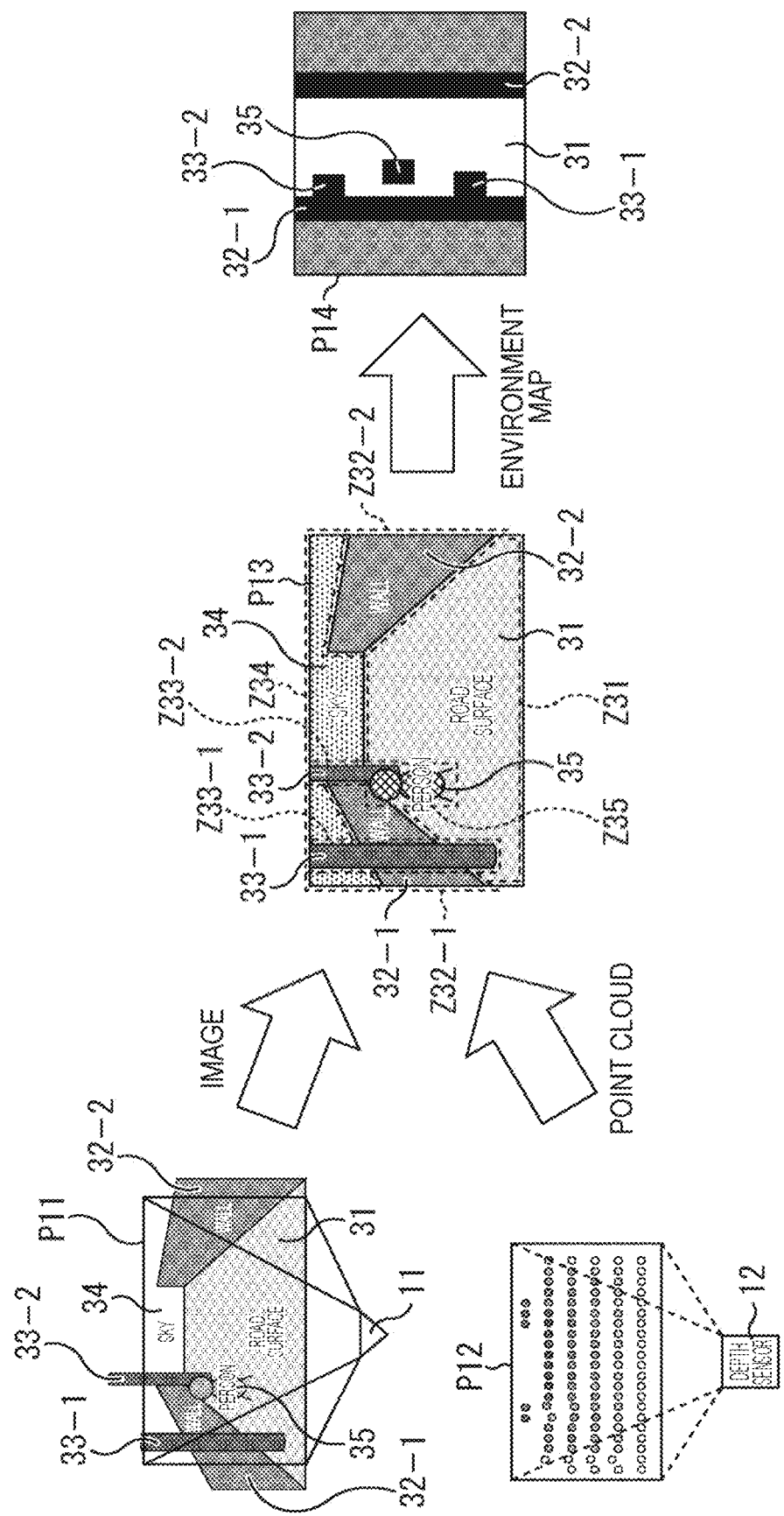
FIG. 1 is a diagram describing an outline of a method for detecting a boundary of a movable area according to the present disclosure.

Hereinafter, preferred embodiments of the present disclosure will be described in detail with reference to the accompanying drawings. Note that in the description and the drawings, components having substantially the same function and configuration are denoted by the same reference numerals, and redundant descriptions are omitted.

Hereinafter, embodiments for carrying out the present technology will be described. The description will be made in the following order.

1. Preferred embodiments of the present disclosure
2. Example of execution by software 1. Preferred Embodiments of the Present Disclosure <Outline of Method for Detecting Boundary of Movable Area>

First, with reference to FIG. 1, an outline of a method for detecting a boundary of a movable area according to the present disclosure will be described.

In a mobile body of the present disclosure, a monocular camera 11 and a depth sensor 12 including a LiDAR (Light Detection and Ranging, Laser Imaging Detection and Ranging), laser radar, or the like, a time-of-flight (ToF), and a stereo camera are included, and an image captured by the camera 11 and a distance image (depth image) based on the point cloud information detected by the depth sensor 12 are used to obtain a movable area in the image and generate an appropriate environment map.

More specifically, as illustrated in FIG. 1, with respect to an image P11 captured by the camera 11, a type of a subject is classified in units of pixels, and a label is given to a classification result.

In a case where an image as illustrated in an image P11 of FIG. 1 is captured, as illustrated in an image P13, each pixel belonging to an area Z31 is given a label indicating the type of a road surface 31, each pixel belonging to areas Z32-1 and Z32-2 is given a label indicating the type of walls 32-1 and 32-2, and each pixel belonging to areas Z33-1 and Z33-2 is given a label indicating the type of stationary structures 33-1 and 33-2. Furthermore, each pixel belonging to an area Z34 is given a label indicating the type of a sky 34, and each pixel belonging to an area Z35 is given a label indicating the type of a person 35. Note that it is assumed that lens distortion and the like in the image have been corrected in advance.

Furthermore, a distance image P12 in which a pixel value of each pixel includes distance information to a subject is obtained on the basis of the point cloud information detected by the depth sensor 12.

Note that in the distance image P12 in a lower left part of FIG. 1, distance information to a subject is expressed in different brightness according to the distance in units of pixels indicated by circles.

Furthermore, in the distance image P12, intervals of pixels including the distance information indicated by circles are of low density compared to the units of pixels of the image P11. Therefore, with respect to the distance image P12, the same resolution as that of the camera 11 is obtained by interpolating and generating distance information for pixels other than the circles using the distance information in units of pixels indicated by the circles.

Furthermore, since the distance image P12 is generated on the basis of the point cloud information (three-dimensional point cloud information) detected by a viewpoint of the depth sensor 12, the coordinate system of each point is converted into a coordinate system based on a viewpoint of the camera 11.

Thus, from the image P11 in which labels are given in units of pixels and the distance image P12 in which distance information is given in units of pixels, labels and distance information are given in units of pixels in the image P13.

That is, on the basis of the image P13 in which labels and distance information are given in units of pixels, an area classified as a road surface, a floor, a flat ground, or the like is obtained as a movable area of the mobile body. In a case of the image P13 in FIG. 1, the area Z31 to which the label of the road surface 31 is given is obtained as the movable area.

When the movable area is obtained, the environment map P14 constituted of a two-dimensional occupancy grid map is obtained on the basis of boundary information of the movable area and the distance information in units of pixels. In the environment map P14 of FIG. 1, a white range is a movable area corresponding to the area Z31 to which the label of the road surface 31 is given in the image P13 obtained from the information of the movable area and the distance information. In addition, black ranges are areas of obstacles corresponding to the areas Z32-1, Z32-2, Z33-1, Z33-2, and Z35 corresponding to the walls 32-1 and 32-2, the stationary structures 33-1 and 33-2, and the person 35, respectively, which are obtained on the basis of the boundary information of the movable area and the distance information. Moreover, a gray range is an unknown area that cannot be visually recognized due to an obstacle.

In the mobile body of the present disclosure, by generating the environment map P14 constituted of the occupancy grid map illustrated in FIG. 1, it is possible to recognize the movable area and achieve autonomous movement on the basis of this environment map P14.

<Semantic Segmentation Error>

Next, an error in labeling depending on the type of a subject will be described with reference to FIG. 2.

As described above, in the mobile body of the present disclosure, upon generating the environment map including the occupancy grid map that allows recognizing the movable area, the type of a subject in the image captured by the camera 11 is classified and a label corresponding to a classification result is given in units of pixels. The process of giving a label corresponding to the classification result of the type of a subject in units of pixels is achieved by semantic segmentation described later. The semantic segmentation is a process in which the types of subjects are classified in units of pixels on the basis of machine learning by deep learning, and a semantic label is given on the basis of the classification result. Regarding giving of the semantic label by this semantic segmentation, an error may occur in the given semantic label depending on conditions of the image.

Figure 2:
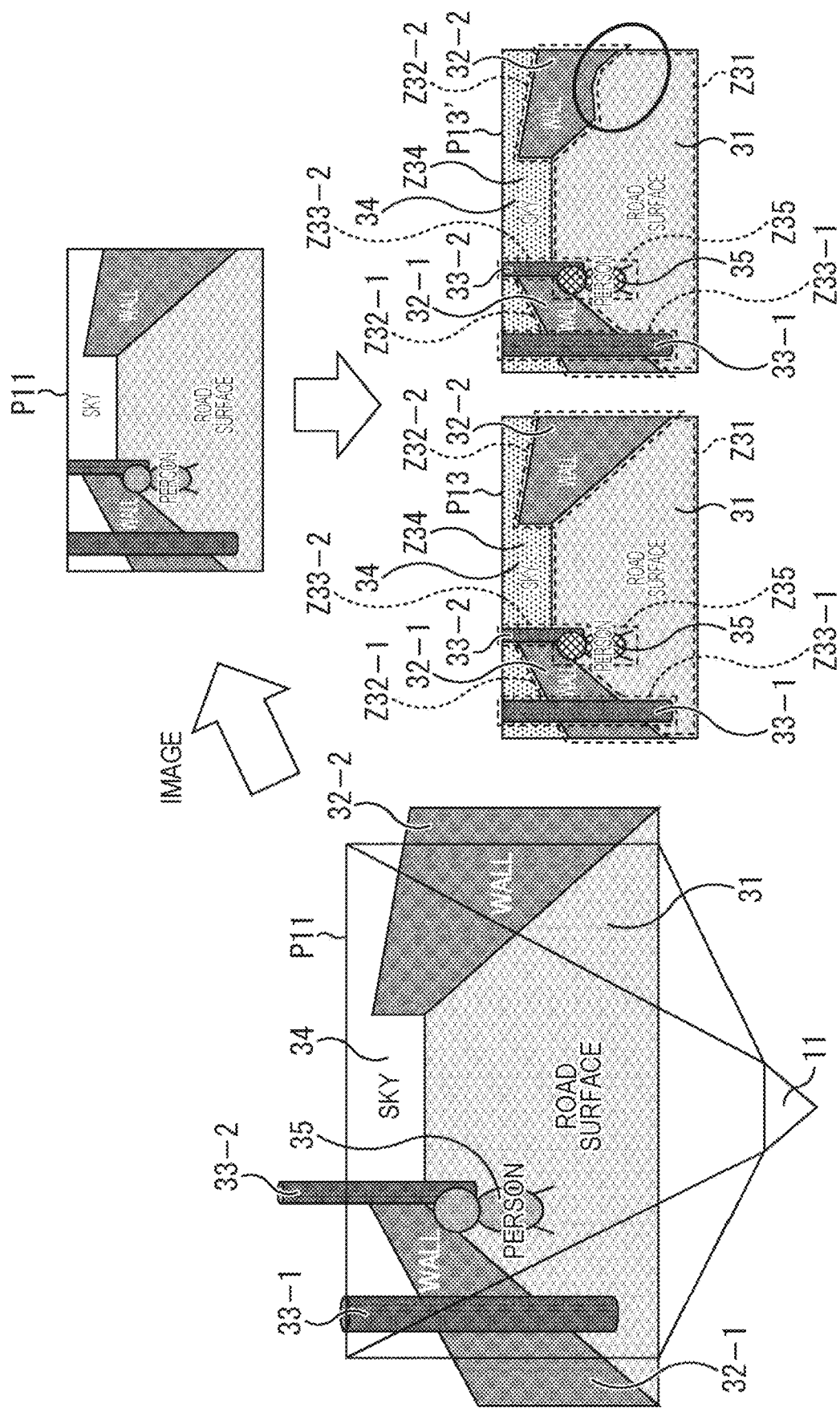
FIG. 2 is a diagram describing an error in semantic segmentation.

That is, a boundary between the area Z31 to which a semantic label of road surface 31 is given and the area Z32-2 to which a semantic label of wall 32-2 is given is originally formed in a straight line as illustrated in the image P13 in a lower right part of FIG. 2.

However, due to differences in the imaging environment such as sensitivity adjustment, white balance, exposure adjustment, and noise in the image of the image P11, by using an image with an imaging environment different from that of a teacher image used at a time of learning, for example, an error may occur as indicated by a solid-line circle in the image P13' in the lower right part of FIG. 2. That is, in the range of the solid circle of the image P13', the boundary between the area Z31 to which the semantic label of road surface 31 is given and the area Z32-2 to which the semantic label of wall 32-2 is given is not formed linear, and the semantic label is not given properly.

Such an error in the semantic segmentation may occur even when the teacher image is a computer graphics (CG) image and can even occur in a case where the student image is a photographed image.

That is, due to occurrence of a difference between the imaging environment in the teacher image and the imaging environment in the student image, it is not possible to properly classify the type of the subject, and an error may occur.

In addition to such cases, for example, this semantic segmentation error is likely to occur in a case of a texture similar to the road surface, such as recognizing as the road surface even through it is not the road surface, or in a case where imaging with different color tones from the teacher image occurs in a dark place or by backlight, or the like.

<Error Due to Depth Sensor>

Next, an error caused by the depth sensor 12 will be described with reference to FIG. 3.

Figure 3:
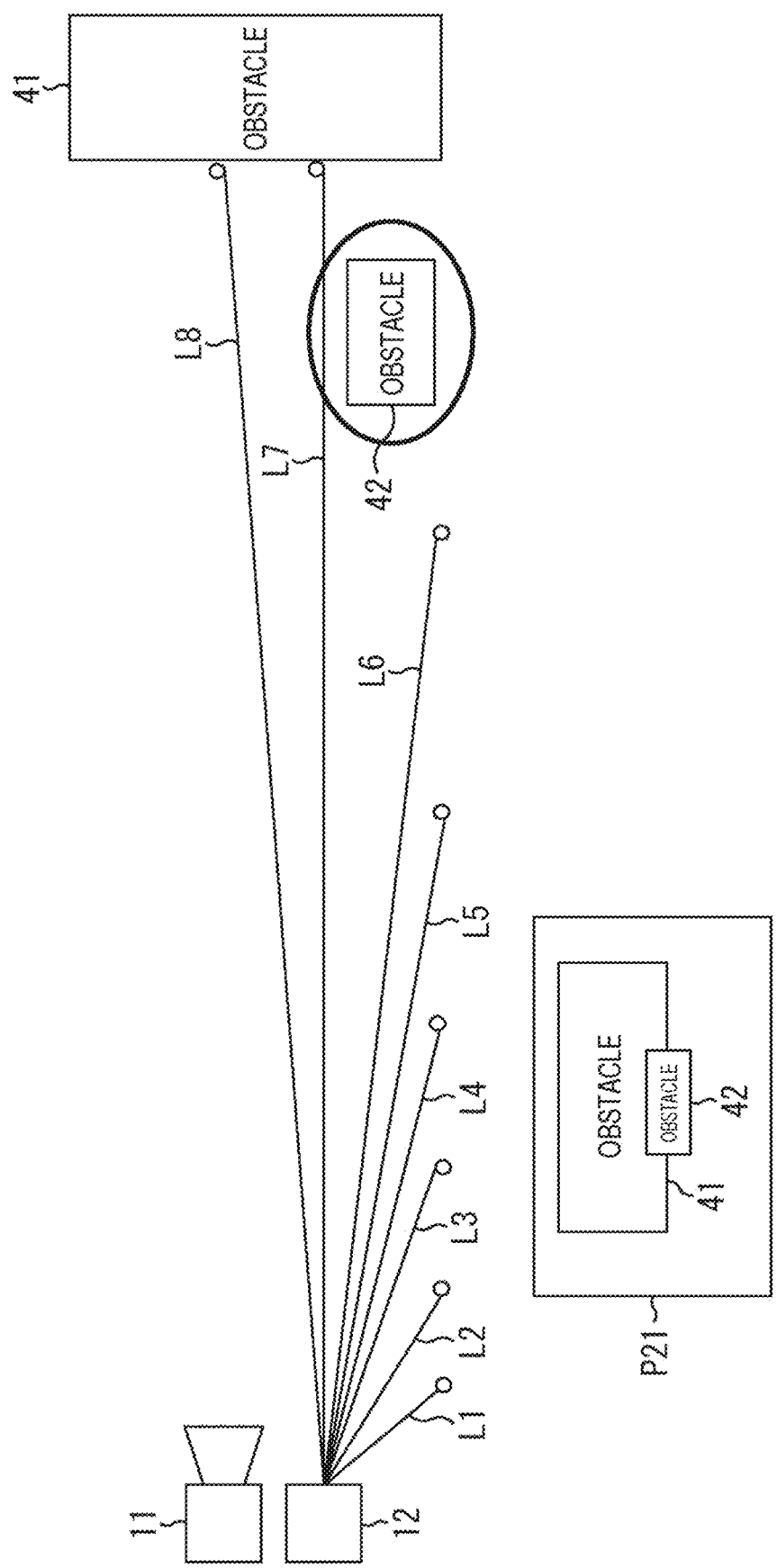
FIG. 3 is a diagram describing a detection omission error of an obstacle by a depth sensor.

In a case where the depth sensor 12 includes, for example, a LiDAR, a laser radar, a ToF sensor, or the like, while a light projecting part, which is arranged at a plurality of angles in the vertical direction with respect to a moving direction forward of the mobile body as illustrated in FIG. 3, is rotated in a horizontal direction and a vertical direction, the depth sensor 12 projects a laser beam in each of radial light projecting directions L1 to L8, receives reflected lights reflected by obstacles 41 and 42, and thereby obtains distances from a round-trip time which is a difference between a light projection time and a reflected light reception time, to thereby measure distances and directions to the obstacles 41 and 42.

Here, as illustrated in FIG. 3, in a case where a distance image is detected by the depth sensor 12 with respect to a range in which the obstacles 41 and 42 exist that are in a positional relationship such that an image as illustrated in an image P21 is captured by the camera 11, a range near the depth sensor 12 can be measured with predetermined accuracy by projecting light with a predetermined density, for example, in the light projecting directions L1 to L5 and the like.

On the other hand, for example, as illustrated by the light projecting directions L6 to L8, in a range far from the depth sensor 12, for a large obstacle like the obstacle 41, reflected lights can be received as in the light projecting directions L7 and L8, and a distance thereof can also be measured.

However, for a small obstacle like the obstacle 42 in the range far from the depth sensor 12, since it is located between the light projecting directions L6 and L7, distance measurement itself cannot be performed. In other words, in the point cloud information detected by the depth sensor 12, the density of projected light becomes lower as it is farther from the detection position of the depth sensor 12, and thus decrease in resolution occurs. Therefore, it is possible that a small obstacle like the obstacle 42 cannot be detected properly. Consequently, even if the resolution is increased by interpolating the distance image based on the point cloud information, a small obstacle will not be detected, which may cause an error.

<Method for Detecting Movable Area Considering Error in Semantic Segmentation and Error in Depth Sensor>

As described above, upon detecting the movable area, it is necessary to consider an error in the semantic segmentation obtained from the image captured by the camera 11 and an error in the distance image detected by the depth sensor 12.

Figure 4:
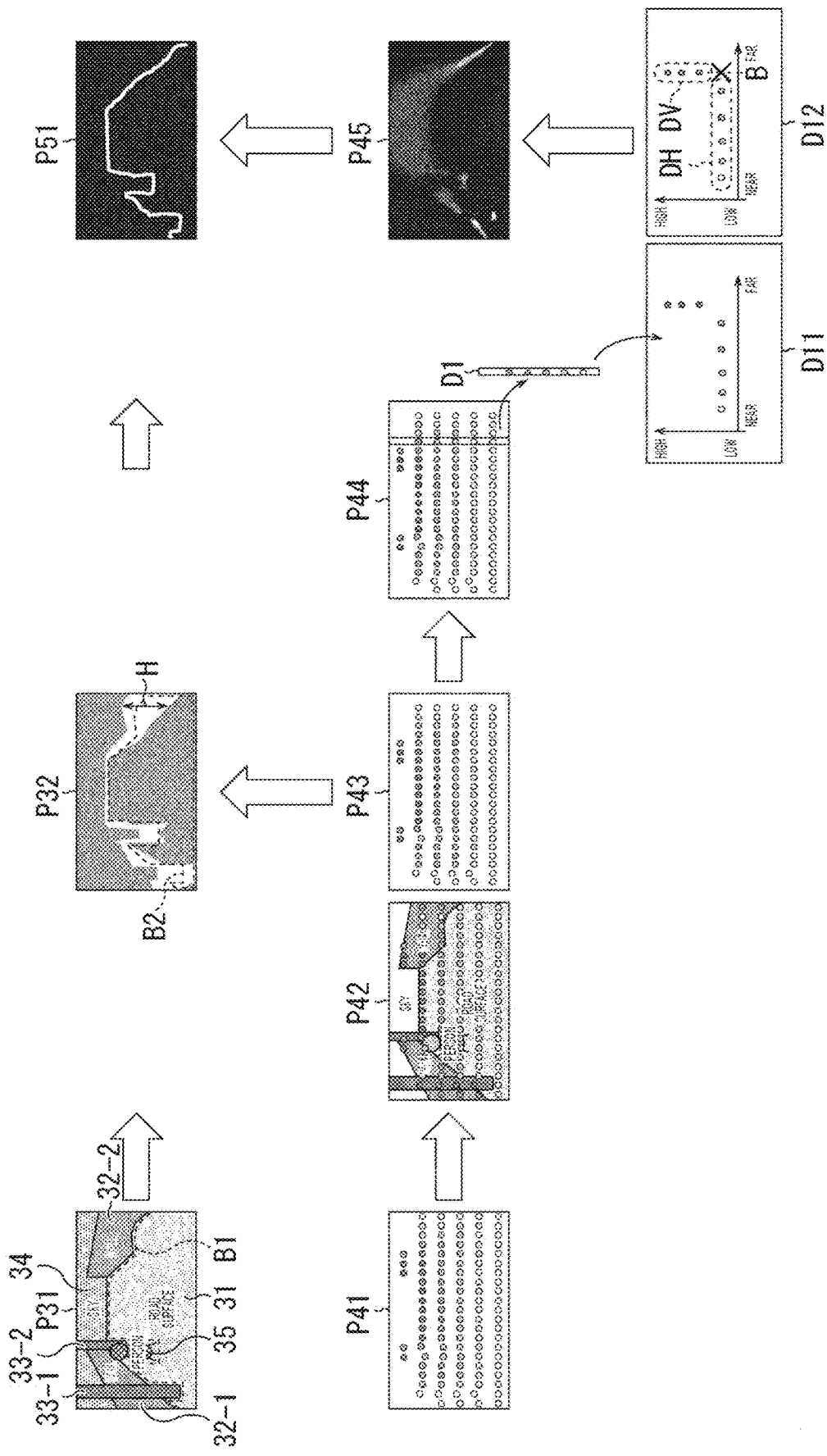
FIG. 4 is a diagram describing a method for detecting a movable area in consideration of an error in the semantic segmentation and an error in the depth sensor.

For example, as illustrated in FIG. 4, for an image P31 to which a semantic label is given in units of pixels by the semantic segmentation on the basis of the image captured by the camera 11, the semantic label is affected by the imaging environment and textures and an error may occur, but as long as the imaging environment is organized, an error with respect to the distance is relatively unlikely to occur in both the near range and the far range. On the other hand, in the distance image detected by the depth sensor 12, as described with reference to FIG. 3, an error is unlikely to occur in a relatively near range but an error is likely to occur in a far range, and an error with respect to change in the imaging environment is unlikely to occur.

Therefore, the movable area can be recognized with high accuracy by setting and using an image movable area boundary cost including a distribution of the possibility that the boundary of the movable area using the semantic segmentation exists, and a distance image movable area boundary cost including a distribution of the possibility that the boundary of the movable area using the distance image exists.

For example, as illustrated in an image P32, for an area where there is a possibility that a boundary of the movable area exists, a vertical width H corresponding to a distance is set, and the image movable area boundary cost is set. Note that the image P32 indicating a boundary cost of the movable area based on the semantic label of the image P31 will be hereinafter simply referred to as an image movable area boundary cost P32.

In the image movable area boundary cost P32, a range in which it is highly possible that the boundary of the movable area exists (a range in which it is highly possible that the boundary exists) is depicted in white, and an area that is highly possible to be other than the range is depicted in black.

In the image movable area boundary cost P32 of FIG. 4, the vertical width H of the white range corresponding to a distance from the imaging position (position of the mobile body) is set with a dotted line B2 that corresponds to a boundary with the road surface 31 being a center, the dotted line B2 corresponding to a dotted line B1 indicating a boundary of the movable area illustrated in the image P31 (boundary with the road surface 31). Specifically, the width H of a white area where the cost is lower is set larger as the distance is nearer (an area where it is highly possible that the boundary exists), and the width H of a white area where the cost is lower is set smaller as the distance from the imaging position (position of the mobile body) is farther.

This is because in a case where the movable area is estimated using the distance image, since an error due to the depth sensor 12 is likely to occur in a far distance area, the width H is set narrow for the far distance range in order to facilitate employing the distribution of the possibility that the boundary of the movable area using the semantic label based on the image captured by the camera 11 with less errors exists.

Furthermore, for a short distance range, since an error is unlikely to occur even in the depth sensor 12, not only the possibility that the boundary of the movable area using the semantic label exists is considered, but also the possibility that the boundary of the movable area based on the distance image exists is considered, and thus the width H of the boundary of the movable area using the semantic label is set wide.

On the other hand, the coordinate system of a distance image P41 obtained from the point cloud information detected with the depth sensor 12 as a viewpoint is different from the coordinate system of the image P31 captured with the camera 11 as a viewpoint, and thus conversion to one of the coordinate systems is performed. Here, it is assumed that the coordinate system of the distance image P41 detected by the depth sensor 12 is converted into the coordinate system of the image P31 captured with the camera 11 as the viewpoint, and converted into a distance image P42. The distance image P42 illustrates a state when the point cloud that has been coordinate-converted is superimposed and displayed on the image P31, and a low-resolution distance image like an image P43 is actually obtained. Furthermore, the distance image P43 obtained by the depth sensor 12 has a low resolution with respect to the image P31 captured by the camera 11, and thus when distance information of a pixel position where distance information does not exist in the distance image P43 is necessary, it is possible to generate the distance information by interpolation from surrounding points where the distance information exists.

Therefore, upon setting the vertical width in the image movable area boundary cost P32, the distance information obtained with the same coordinate system as the camera 11 and by interpolation from the distance image P43 is used, the width H is set on the basis of the distance information generated by interpolation from the image P43 corresponding to each pixel on the boundary B2 in the image P32, and the image movable area boundary cost P32 is set.

Furthermore, on the basis of a column unit distance information D1 that is distance information (point cloud information) for every column in the distance image P43, a distribution D11 between the distance and the height is obtained, and as illustrated in a distribution D12, a search is performed for a boundary between the road surface 31 and an obstacle, the boundary being an intersection indicated by a cross between a horizontal distribution DH assumed as the road surface 31 and a vertical distribution DV assumed as an obstacle, that is, a boundary of the movable area, so as to obtain a distance of the boundary in units of columns.

Here, regarding a depth movable area boundary cost P45 obtained with the distance image P43, as the distance is farther, accuracy of the depth sensor 12 is lower, and thus the cost is set larger so as to indicate a low possibility that the boundary of the movable area in the distance detected in units of columns exists. Furthermore, regarding the depth movable area boundary cost P45, as the distance is nearer, accuracy of the depth sensor 12 is higher, and thus the cost is set smaller so as to indicate a high possibility that the boundary of the movable area in the distance detected in units of columns exists.

That is, regarding the image movable area boundary cost P32, as the distance is nearer, the width of an area where the cost depicted in white is lower and it is highly possible that the boundary exists is set larger, and as the distance is farther, the width of an area where the cost depicted in white is lower and it is highly possible that the boundary exists is set smaller.

On the other hand, regarding the depth movable area boundary cost P45, as the distance is nearer, accuracy of the depth sensor 12 is higher and thus the cost is lower, the boundary of the movable area is depicted in a color close to white, and it is set as an area where there is a high possibility that the boundary exists, and as the distance is farther, the cost is higher, it is depicted in a color close to black, and it is set as an area where there is a low possibility that the boundary exists.

Finally, a boundary P51 of the movable area to be obtained is identified by integration by optimization processing using the image movable area boundary cost P32 and the depth movable area boundary cost P45. That is, in the integrated movable area boundary P51, a linear area depicted in white is obtained as a boundary between the movable area and another area. That is, in the integrated movable area boundary P51, it is illustrated that a range below the boundary of the movable area depicted in white is the movable area, and the range above the boundary is an area other than the movable area.

<Configuration Example of Vehicle Control System that is Example of Mobile Body Control System in Case where Mobile Body is Vehicle>

Next, a vehicle control system that is an example of a mobile body control system in a case where the mobile body to which the present technology can be applied is a vehicle will be described.

Figure 5:
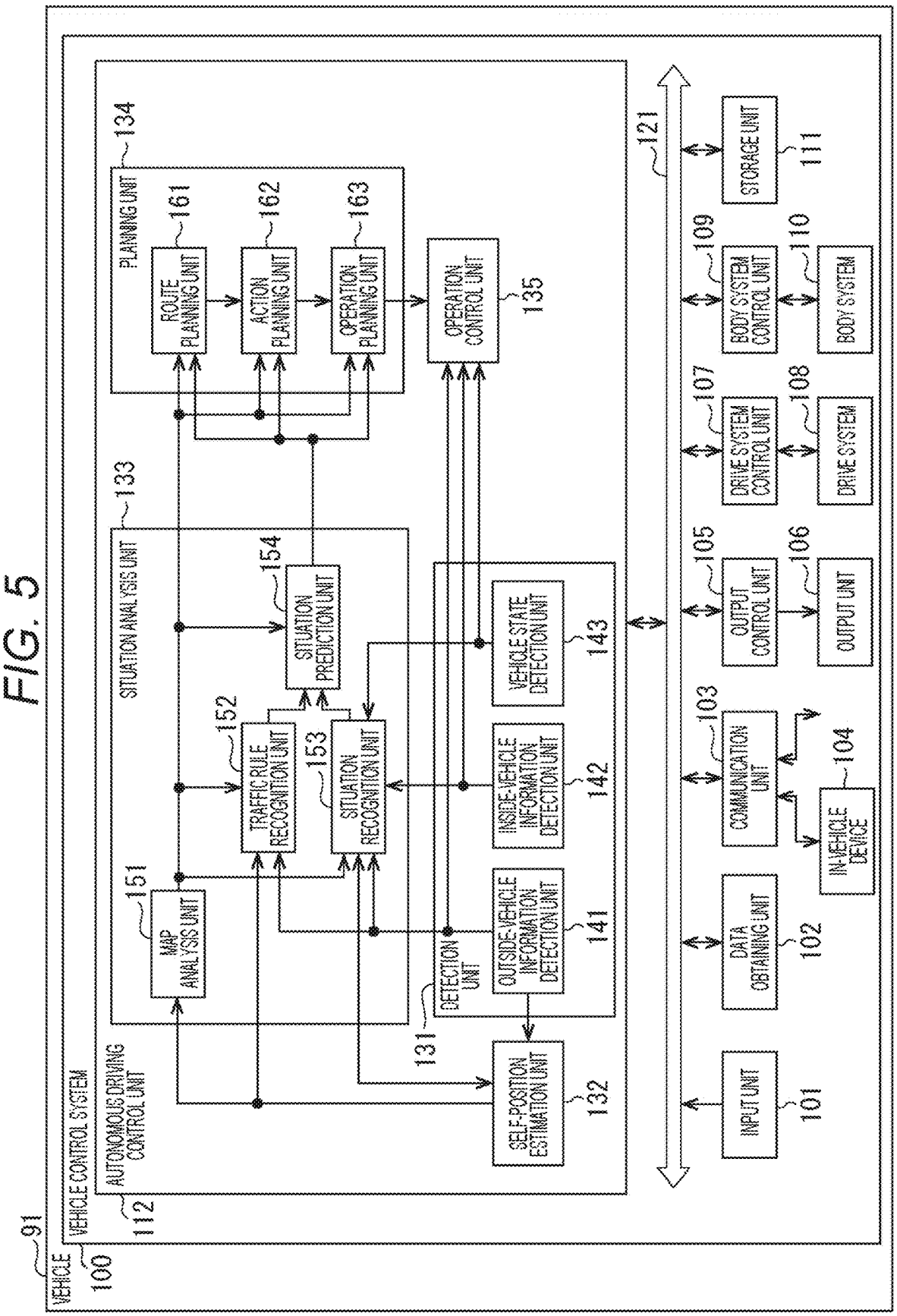
FIG. 5 is a block diagram describing a configuration example of a vehicle control system that is an example of a mobile body control system in a case where a mobile body of the present disclosure is a vehicle.

FIG. 5 is a block diagram illustrating a configuration example of a schematic function of a vehicle control system 100 of a vehicle 91 that is an example of a mobile body control system to which the present technology can be applied.

Note that, hereinafter, in a case where a vehicle provided with the vehicle control system 100 is distinguished from other vehicles, the vehicle will be referred to as an own vehicle or an own motor vehicle.

The vehicle control system 100 includes an input unit 101, a data obtaining unit 102, a communication unit 103, an in-vehicle device 104, an output control unit 105, an output unit 106, a drive system control unit 107, a drive system 108, a body system control unit 109, a body system 110, a storage unit 111, and an autonomous driving control unit 112. The input unit 101, the data obtaining unit 102, the communication unit 103, the output control unit 105, the drive system control unit 107, the body system control unit 109, the storage unit 111, and the autonomous driving control unit 112 are connected to each other via a communication network 121. The communication network 121 is, for example, an in-vehicle communication network, a bus, or the like, that conforms to any standard such as Controller Area Network (CAN), Local Interconnect Network (LIN), Local Area Network (LAN), or FlexRay (registered trademark). Note that each unit of the vehicle control system 100 may be directly connected without passing through the communication network 121.

Note that, hereinafter, in a case where each unit of the vehicle control system 100 performs communication via the communication network 121, description of the communication network 121 is omitted. For example, in a case where the input unit 101 and the autonomous driving control unit 112 perform communication via the communication network 121, it is simply described that the input unit 101 and the autonomous driving control unit 112 perform communication.

The input unit 101 includes a device used by a passenger for inputting various data, instructions, and the like. For example, the input unit 101 includes operating devices such as a touch panel, a button, a microphone, a switch, and a lever, an operating device that allows input by a method other than manual operation by a voice, a gesture, or the like, and the like. Further, for example, the input unit 101 may be a remote control device using infrared rays or other radio waves, or an externally connected device such as a mobile device or a wearable device corresponding to operation of the vehicle control system 100. The input unit 101 generates an input signal on the basis of data or instructions or the like input by the passenger and supplies the input signal to each unit of the vehicle control system 100.

The data obtaining unit 102 includes various sensors or the like that obtain data used for processing of the vehicle control system 100, and supplies the obtained data to each unit of the vehicle control system 100.

For example, the data obtaining unit 102 includes various sensors for detecting a state or the like of the own vehicle. Specifically, for example, the data obtaining unit 102 includes a gyro sensor, an acceleration sensor, an inertial measurement device (IMU), and a sensor or the like for detecting an operating amount of an accelerator pedal, an operating amount of a brake pedal, a steering angle of a steering wheel, an engine speed, a motor rotation speed, or a rotation speed of the wheel, or the like.

Further, for example, the data obtaining unit 102 includes various sensors for detecting information outside the own vehicle. Specifically, for example, the data obtaining unit 102 includes an image capturing device such as a time-of-flight (ToF) camera, a stereo camera, a monocular camera, an infrared camera, and other cameras. Furthermore, for example, the data obtaining unit 102 includes an environment sensor for detecting weather or climate or the like and a surrounding information detection sensor for detecting objects around the own vehicle. The environmental sensor includes, for example, a raindrop sensor, a fog sensor, a sunshine sensor, a snow sensor, and the like. The surrounding information detection sensor includes, for example, an ultrasonic sensor, a radar, a LiDAR (Light Detection and Ranging, Laser Imaging Detection and Ranging), a sonar, and the like.

Note that in the vehicle control system 100 of the present disclosure, the data obtaining unit 102 includes the camera 11 of FIG. 1 as an image capturing device, and includes, as the depth sensor 12 of FIG. 2, at least one of a LiDAR, a laser range finder, a TOF camera, or a stereo camera, for example.

Moreover, for example, the data obtaining unit 102 includes various sensors for detecting a current position of the own vehicle. Specifically, for example, the data obtaining unit 102 includes a global navigation satellite system (GNSS) receiver that receives a GNSS signal from a GNSS satellite, or the like.

Further, for example, the data obtaining unit 102 includes various sensors for detecting information in the vehicle. Specifically, for example, the data obtaining unit 102 includes an image capturing device that captures an image of a driver, a biological sensor that detects biological information of the driver, a microphone that collects sound in a vehicle interior, and the like. The biometric sensor is provided on, for example, a seat surface or a steering wheel or the like, and detects biological information of a passenger sitting on the seat or a driver holding the steering wheel.

The communication unit 103 communicates with the in-vehicle device 104 and various devices, a server, a base station, and the like outside the vehicle, transmits data supplied from each unit of the vehicle control system 100, and supplies received data to each unit of the vehicle control system 100. Note that a communication protocol supported by the communication unit 103 is not particularly limited, and furthermore, the communication unit 103 can support a plurality of types of communication protocols.

For example, the communication unit 103 performs wireless communication with the in-vehicle device 104 by wireless LAN, Bluetooth (registered trademark), Near Field Communication (NFC), Wireless USB (WUSB), or the like. Further, for example, the communication unit 103 performs wired communication with the in-vehicle device 104 by a Universal Serial Bus (USB), High-Definition Multimedia Interface (HDMI) (registered trademark), Mobile High-definition Link (MHL), or the like via a connection terminal (and a cable if necessary) that is not illustrated.

Moreover, for example, the communication unit 103 communicates with a device (for example, an application server or a control server) existing on an external network (for example, the Internet, a cloud network, or an operator-specific network) via a base station or an access point. Further, for example, the communication unit 103 uses peer-to-peer (P2P) technology to communicate with a terminal (for example, a terminal of a pedestrian or a store, or a machine-type communication (MTC) terminal) that exists in the vicinity of the own vehicle. Moreover, for example, the communication unit 103 performs V2X communication such as vehicle-to-vehicle communication, vehicle-to-infrastructure communication, vehicle-to-home communication, and vehicle-to-pedestrian communication. Furthermore, for example, the communication unit 103 includes a beacon receiving unit to receive radio waves or electromagnetic waves transmitted from wireless stations and the like installed on the road, and obtain information such as the current position, traffic jam, traffic regulation, or required time.

The in-vehicle device 104 includes, for example, a mobile device or a wearable device possessed by a passenger, an information device that is carried in or attached to the own vehicle, and a navigation device or the like that searches for a route to an arbitrary destination.

The output control unit 105 controls output of various information to a passenger of the own vehicle or the outside of the vehicle. For example, the output control unit 105 generates an output signal including at least one of visual information (for example, image data) or auditory information (for example, audio data), and supplies the output signal to the output unit 106, so as to control output of visual and auditory information from the output unit 106. Specifically, for example, the output control unit 105 generates an overhead image or a panoramic image or the like by combining image data imaged by different image capturing devices of the data obtaining unit 102, and supplies an output signal including the generated image to the output unit 106. Furthermore, for example, the output control unit 105 generates sound data including a warning sound or a warning message or the like for danger such as collision, contact, or entry into a danger zone, and supplies an output signal including the generated sound data to the output unit 106.

The output unit 106 includes a device capable of outputting visual information or auditory information to a passenger of the own vehicle or the outside of the vehicle. For example, the output unit 106 includes a display device, an instrument panel, an audio speaker, headphones, a wearable device such as a glasses-type display worn by a passenger, a projector, a lamp, and the like. The display device included in the output unit 106 may be, besides a device having a normal display, a display device that displays visual information in a visual field of a driver, for example, a head-up display, a transmission type display, a device having an augmented reality (AR) display function, or the like.

The drive system control unit 107 controls the drive system 108 by generating various control signals and supplying them to the drive system 108. Furthermore, the drive system control unit 107 supplies a control signal to each unit other than the drive system 108 as necessary, and performs notification of a control state of the drive system 108, and the like.

The drive system 108 includes various devices related to the drive system of the own vehicle. For example, the drive system 108 includes a driving force generator for generating a driving force, such as an internal combustion engine or a driving motor, a driving force transmission mechanism for transmitting the driving force to wheels, a steering mechanism that adjusts a steering angle, a braking device that generates a braking force, an antilock brake system (ABS), an electronic stability control (ESC), and an electric power steering device, and the like.

The body system control unit 109 controls the body system 110 by generating various control signals and supplying them to the body system 110. Further, the body system control unit 109 supplies a control signal to each unit other than the body system 110 as necessary, and performs notification of a control state of the body system 110, or the like.

The body system 110 includes various body devices that are mounted on the vehicle body. For example, the body system 110 includes a keyless entry system, a smart key system, a power window device, a power seat, a steering wheel, an air conditioner, and various lamps (for example, a head lamp, a back lamp, a brake lamp, a blinker, a fog lamp, and the like), and the like.

The storage unit 111 includes, for example, a read only memory (ROM), a random access memory (RAM), a magnetic storage device such as a hard disc drive (HDD), a semiconductor storage device, an optical storage device, a magneto-optical storage device, and the like. The storage unit 111 stores various programs, data, and the like, used by each unit of the vehicle control system 100. For example, the storage unit 111 stores map data of a three-dimensional high-precision map such as a dynamic map, a global map that is less accurate than the high-precision map and covers a wide area, a local map that includes information around the own vehicle, and the like.

The autonomous driving control unit 112 performs control related to autonomous driving such as autonomous traveling or driving support. Specifically, for example, the autonomous driving control unit 112 performs cooperative control for the purpose of achieving Advanced Driver Assistance System (ADAS) functions including collision avoidance or impact mitigation of the own vehicle, follow-up traveling based on the inter-vehicle distance, vehicle speed-maintaining traveling, warning of collision of the own vehicle, own vehicle lane departure warning, or the like. Further, for example, the autonomous driving control unit 112 performs cooperative control for the purpose of autonomous driving or the like to autonomously travel without depending on operation of the driver. The autonomous driving control unit 112 includes a detection unit 131, a self-position estimation unit 132, a situation analysis unit 133, a planning unit 134, and an operation control unit 135.

The detection unit 131 detects various information necessary for controlling autonomous driving. The detection unit 131 includes an outside-vehicle information detection unit 141, an inside-vehicle information detection unit 142, and a vehicle state detection unit 143.

The outside-vehicle information detection unit 141 performs a detection process of information outside the own vehicle on the basis of data or signals from each unit of the vehicle control system 100. For example, the outside-vehicle information detection unit 141 performs a detection process, a recognition process, and a tracking process of an object around the own vehicle, and a detection process of the distance to an object around the own vehicle. Examples of objects to be detected include vehicles, people, obstacles, structures, roads, traffic lights, traffic signs, road markings, and the like. Further, for example, the outside-vehicle information detection unit 141 performs a detection process of a surrounding environment of the own vehicle. The surrounding environment as a detection target includes, for example, weather, temperature, humidity, brightness, and road surface conditions, and the like. The outside-vehicle information detection unit 141 supplies data indicating results of detection processes to the self-position estimation unit 132, a map analysis unit 151, a traffic rule recognition unit 152, and a situation recognition unit 153 of the situation analysis unit 133, and an operation control unit 135.

The inside-vehicle information detection unit 142 performs a detection process of inside-vehicle information on the basis of data or signals from each unit of the vehicle control system 100. For example, the inside-vehicle information detection unit 142 performs an authentication process and a recognition process of a driver, a state detection process of the driver, a detection process of a passenger, a detection process of in-vehicle environment, and the like. The state of the driver to be detected includes, for example, physical condition, awakening level, concentration level, fatigue level, line-of-sight direction, and the like. The in-vehicle environment to be detected includes, for example, temperature, humidity, brightness, smell, and the like. The inside-vehicle information detection unit 142 supplies data indicating a result of a detection process to the situation recognition unit 153 of the situation analysis unit 133, and the operation control unit 135.

The vehicle state detection unit 143 performs a detection process of the state of the own vehicle on the basis of data or signals from each unit of the vehicle control system 100. The state of the own vehicle to be detected includes, for example, speed, acceleration, steering angle, presence or absence and content of abnormality, driving operation state, position and inclination of power seat, door lock state, and states of other in-vehicle devices, and the like. The vehicle state detection unit 143 supplies data indicating a result of the detection process to the situation recognition unit 153 of the situation analysis unit 133, and the operation control unit 135.

The self-position estimation unit 132 performs an estimation process of the position, posture, and the like of the own vehicle on the basis of data or signals from respective units of the vehicle control system 100 such as the outside-vehicle information detection unit 141 and the situation recognition unit 153 of the situation analysis unit 133. Furthermore, the self-position estimation unit 132 generates a local map (hereinafter referred to as a situation recognition map or environment map) used for own position estimation as necessary. The local map is, for example, a highly accurate map using a technique such as simultaneous localization and mapping (SLAM). The self-position estimation unit 132 supplies data indicating a result of the estimation process to the map analysis unit 151, the traffic rule recognition unit 152, and the situation recognition unit 153 of the situation analysis unit 133, and the like. Furthermore, the self-position estimation unit 132 causes the storage unit 111 to store the local map.

The situation analysis unit 133 performs an analysis process of the own vehicle and the surrounding situation. The situation analysis unit 133 includes a map analysis unit 151, a traffic rule recognition unit 152, a situation recognition unit 153, and a situation prediction unit 154.

The map analysis unit 151 performs an analysis process of various types of maps stored in the storage unit 111 using data or signals from each unit of the vehicle control system 100 such as the self-position estimation unit 132 and the outside-vehicle information detection unit 141 as necessary, and constructs a map that contains information necessary for processing of autonomous driving. The map analysis unit 151 supplies the constructed map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs a recognition process of traffic rules around the own vehicle on the basis of data or signals from each unit of the vehicle control system 100 such as the self-position estimation unit 132, the outside-vehicle information detection unit 141, and the map analysis unit 151. By this recognition process, for example, positions and states of signals around the own vehicle, contents of traffic restrictions around the own vehicle, and lanes that can be traveled, and the like are recognized. The traffic rule recognition unit 152 supplies data indicating a recognition processing result to the situation prediction unit 154 and the like.

The situation recognition unit 153 performs a recognition process of a situation related to the own vehicle on the basis of data or signals from each unit of the vehicle control system 100 such as the self-position estimation unit 132, the outside-vehicle information detection unit 141, the inside-vehicle information detection unit 142, the vehicle state detection unit 143, and the map analysis unit 151. For example, the situation recognition unit 153 performs a recognition process of a situation of the own vehicle, a situation around the own vehicle, a situation of the driver of the own vehicle, and the like. Further, the situation recognition unit 153 generates a local map (hereinafter referred to as a situation recognition map or environment map) used for recognizing the situation around the own vehicle as necessary. The environment map is, for example, an occupancy grid map.

The situation of the own vehicle to be recognized includes, for example, position, posture, and movement (for example, speed, acceleration, moving direction, and the like) of the own vehicle, presence or absence and content of abnormality, and the like. The situation around the own vehicle to be recognized includes, for example, type and position of a surrounding stationary object, type, position, and movement of a surrounding moving object (for example, speed, acceleration, moving direction, and the like), configuration and road surface condition of a surrounding road, ambient weather, temperature, humidity, brightness, and the like. The state of the driver as a recognition target includes, for example, physical condition, awakening level, concentration level, fatigue level, line-of-sight movement, and driving operation, and the like.

The situation recognition unit 153 supplies data indicating a result of the recognition process (including the environment map as necessary) to the self-position estimation unit 132, the situation prediction unit 154, and the like. Further, the situation recognition unit 153 causes the storage unit 111 to store the environment map.

The situation prediction unit 154 performs a prediction process of a situation related to the own vehicle on the basis of data or signals from each unit of the vehicle control system 100 such as the map analysis unit 151, the traffic rule recognition unit 152, and the situation recognition unit 153. For example, the situation prediction unit 154 performs a prediction process of a situation of the own vehicle, a situation around the own vehicle, a situation of the driver, and the like.

The situation of the own vehicle to be predicted includes, for example, behavior of the own vehicle, occurrence of abnormality, travelable distance, and the like. The situation around the own vehicle to be predicted includes, for example, a behavior of a moving object around the own vehicle, a change in a signal state, a change in the environment such as weather, and the like. The situation of the driver as a prediction target includes, for example, a behavior and physical condition and the like of the driver.

The situation prediction unit 154 supplies data indicating a result of the prediction process, together with data from the traffic rule recognition unit 152 and the situation recognition unit 153, to the route planning unit 161, the action planning unit 162, and the operation planning unit 163 of the planning unit 134, and the like.

The route planning unit 161 plans a route to a destination on the basis of data or signals from each unit of the vehicle control system 100 such as the map analysis unit 151 and the situation prediction unit 154. For example, the route planning unit 161 sets a route from the current position to a designated destination on the basis of the global map. Furthermore, for example, the route planning unit 161 changes the route as appropriate on the basis of situations of traffic jam, accident, traffic restriction, construction, and the like and physical condition of the driver, and the like. The route planning unit 161 supplies data indicating a planned route to the action planning unit 162 and the like.

On the basis of data or signals from each unit of the vehicle control system 100 such as the map analysis unit 151 and the situation prediction unit 154, the action planning unit 162 plans actions of the own vehicle for safely traveling the route planned by the route planning unit 161 within a planned time. For example, the action planning unit 162 performs plans of start, stop, traveling direction (for example, forward, backward, left turn, right turn, direction change, and the like), travel lane, travel speed, overtaking, or the like. The action planning unit 162 supplies data indicating planned actions of the own vehicle to the operation planning unit 163 and the like.

The operation planning unit 163 plans operations of the own vehicle for implementing the actions planned by the action planning unit 162 on the basis of data or signals from each unit of the vehicle control system 100 such as the map analysis unit 151 and the situation prediction unit 154. For example, the operation planning unit 163 performs planning of acceleration, deceleration, traveling track, and the like. The operation planning unit 163 supplies data indicating the planned operations of the own vehicle to the operation control unit 135.

The operation control unit 135 controls operations of the own vehicle.

The operation control unit 135 performs a detection process of an emergency situation such as a collision, a contact, an entry into a danger zone, a driver abnormality, or a vehicle abnormality, on the basis of detection results of the outside-vehicle information detection unit 141, the inside-vehicle information detection unit 142, and the vehicle state detection unit 143. When the operation control unit 135 detects occurrence of an emergency, the operation control unit 135 plans an operation of the own vehicle to avoid the emergency such as a sudden stop or a sudden turn.

The operation control unit 135 performs acceleration-deceleration control for implementing the operation of the own vehicle planned by the operation planning unit 163. For example, the operation control unit 135 calculates a control target value of the driving force generator or the braking device for implementing the planned acceleration, deceleration, or sudden stop, and supplies a control command indicating the calculated control target value to the drive system control unit 107.

The operation control unit 135 performs direction control for implementing the operation of the own vehicle planned by the operation planning unit 163. For example, the operation control unit 135 calculates a control target value of the steering mechanism for implementing a traveling track or an abrupt turn planned by the operation planning unit 163, and supplies a control command indicating the calculated control target value to the drive system control unit 107.

<Configuration Example of Robot Control System that is Example of Mobile Body Control System in Case where Mobile Body is Robot>

Next, a configuration example of a robot control system that is an example of a mobile body control system in a case where the mobile body is a robot will be described.

Figure 6:
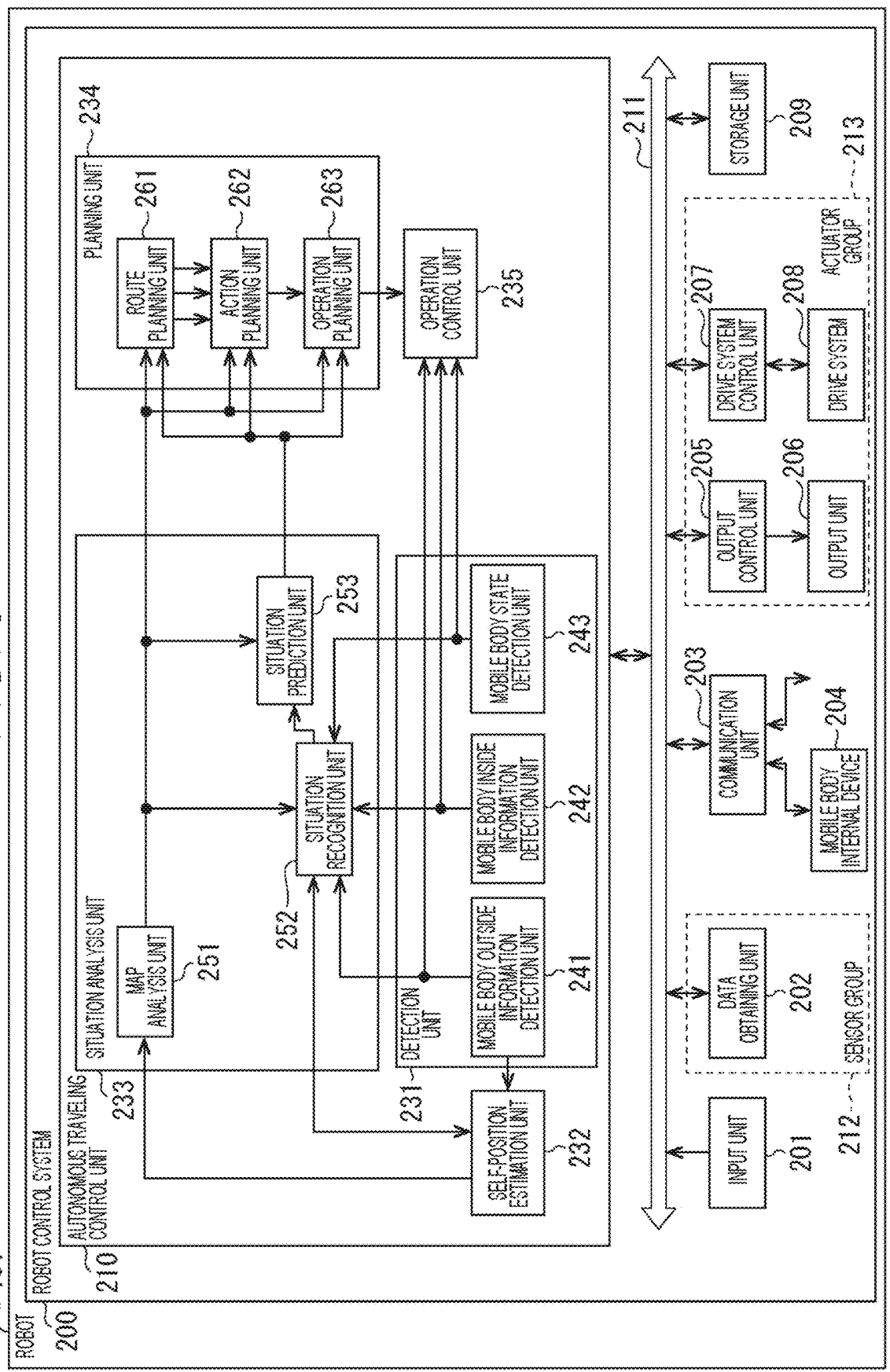
FIG. 6 is a block diagram describing a configuration example of a robot control system that is an example of the mobile body control system in a case where the mobile body of the present disclosure is a robot.

FIG. 6 is a block diagram illustrating a configuration example of a schematic function of a robot control system 200 that controls the robot 191.

Note that the vehicle control system 100 of FIG. 5 and the robot control system 200 of FIG. 6 are examples of a mobile body control system to which the present technology can be applied, and can also be applied as a system for controlling other mobile bodies such as an aircraft, a ship, a drone, and the like for example.

The robot control system 200 includes an input unit 201, a data obtaining unit 202, a communication unit 203, a mobile body internal device 204, an output control unit 205, an output unit 206, a drive system control unit 207, a drive system 208, a storage unit 209, and an autonomous traveling control unit 210. The input unit 201, the data obtaining unit 202, the communication unit 203, the output control unit 205, the drive system control unit 207, the storage unit 209, and the autonomous traveling control unit 210 are mutually connected via a communication network 221. The communication network 221 is, for example, a communication network, a bus, or the like, that conforms to any standard such as Controller Area Network (CAN), Local Interconnect Network (LIN), Local Area Network (LAN), or FlexRay (registered trademark). Note that respective units of the robot control system 200 can also be directly connected without passing through the communication network 221.

Note that hereinafter, when each unit of the robot control system 200 communicates via the communication network 221, description of the communication network 221 is omitted. For example, in a case where the input unit 201 and the autonomous traveling control unit 210 communicate via the communication network 221, it is simply described that the input unit 201 and the autonomous traveling control unit 210 perform communication.

Further, the input unit 201, the data obtaining unit 202, the communication unit 203, the mobile body internal device 204, the output control unit 205, the output unit 206, the drive system control unit 207, the drive system 208, the storage unit 209, and the autonomous traveling control unit 210 are components corresponding to the input unit 101, the data obtaining unit 102, the communication unit 103, the in-vehicle device 104, the output control unit 105, the output unit 106, the drive system control unit 107, the drive system 108, the storage unit 111, and the autonomous driving control unit 112 in FIG. 5, respectively, and thus description related to the same function is omitted as appropriate.

The data obtaining unit 202 forms a sensor group 212 including various sensors and the like that obtain data used for processing of the robot control system 200, and supplies the obtained data to each unit of the robot control system 200.

For example, the data obtaining unit 202 includes various sensors for detecting a state or the like of the mobile body. Specifically, for example, the data obtaining unit 202 includes a gyro sensor, an acceleration sensor, an inertial measurement device (IMU), and a sensor or the like for detecting an operating amount of an acceleration input of an accelerator or the like, an operating amount of a deceleration input, an operating amount of a direction instruction input, the number of rotations, input-output energy, or fuel amount of a drive apparatus such as an engine or a motor, the amount of torque of an engine, motor, or the like, or the rotation speed or torque of a wheel or joint, and the like.

Note that in the robot control system 200 of the present disclosure, the data obtaining unit 202 includes the camera 11 of FIG. 1 as an image capturing device, and includes at least one of a LiDAR, a laser range finder, a ToF camera, or a stereo camera as the depth sensor 12.

The output control unit 205, the output unit 206, the drive system control unit 207, and the drive system 208 form an actuator group 213 including an actuator including a motor or the like for a foot for walking of a robot, and a control mechanism that controls them.

The drive system 208 includes various devices related to the drive system of the mobile body. For example, the drive system 208 includes a servomotor provided at each joint of four legs and capable of designating an angle and torque, a motion controller that disassembles a motion of traveling of the robot itself into motions of four legs and replaces the motion with them, and a feedback control device with a sensor in each motor or a sensor on the sole of a foot.

In another example, the drive system 208 includes a motor having four to six upward propellers on the body, and a motion controller that disassembles a motion of traveling of the robot itself into the amounts of rotation of respective motors and replaces the motion with them.

Moreover, in another example, the drive system 208 includes a driving force generator for generating a driving force, such as an internal combustion engine or a drive motor, a driving force transmission mechanism for transmitting the driving force to wheels, a steering mechanism that adjusts a steering angle, a braking device that generates a braking force, an antilock brake system (ABS), an electronic stability control (ESC), and an electric power steering device, and the like.

The autonomous traveling control unit 210 performs control related to autonomous traveling, such as autonomous driving or driving assistance, of the robot 191. Specifically, for example, the autonomous traveling control unit 210 performs cooperative control for the purpose of achieving functions of avoiding collision or mitigating impact of the mobile body, follow-up traveling based on a distance between mobile bodies, speed-maintained traveling of the mobile body, or a warning of collision of the mobile body. Furthermore, for example, the autonomous traveling control unit 210 performs cooperative control aiming at autonomous traveling or the like to autonomously travel without depending on operation by an operator or user. The autonomous traveling control unit 210 includes a detection unit 231, a self-position estimation unit 232, a situation analysis unit 233, a planning unit 234, and an operation control unit 235.

The detection unit 231 detects various kinds of information necessary for controlling autonomous traveling. The detection unit 231 includes a mobile body outside information detection unit 241, a mobile body inside information detection unit 242, and a mobile body state detection unit 243.

The mobile body outside information detection unit 241 performs a detection process of outside information of the mobile body on the basis of data or signals from each unit of the robot control system 200. For example, the mobile body outside information detection unit 241 performs a detection process, a recognition process, and a tracking process of an object around the mobile body, and a detection process of the distance to the object. Objects as detection targets include, for example, mobile bodies, people, obstacles, structures, roads, traffic lights, traffic signs, road markings, and the like. Furthermore, for example, the mobile body outside information detection unit 241 performs a detection process of a surrounding environment of the mobile body. The surrounding environment as a detection target includes, for example, weather, temperature, humidity, brightness, and road surface conditions, and the like. The mobile body outside information detection unit 241 supplies data indicating a result of the detection process to the self-position estimation unit 232, a map analysis unit 251 and a situation recognition unit 252 of the situation analysis unit 233, and the operation control unit 235.

The mobile body inside information detection unit 242 performs a detection process of information inside the mobile body on the basis of data or signals from each unit of the robot control system 200. For example, the mobile body inside information detection unit 242 performs an authentication process and a recognition process of a driver, a driver state detection process, a passenger detection process, and an environment detection process inside the mobile body, and the like. The state of the driver to be detected includes, for example, physical condition, awakening level, concentration level, fatigue level, line-of-sight direction, and the like. The environment inside the mobile body as a detection target includes, for example, temperature, humidity, brightness, odor, and the like. The mobile body inside information detection unit 242 supplies data indicating a result of a detection process to the situation recognition unit 252 of the situation analysis unit 233 and the operation control unit 235.

The mobile body state detection unit 243 performs a detection process of the state of the mobile body on the basis of data or signals from each unit of the robot control system 200. The state of the mobile body as a detection target includes, for example, speed, acceleration, steering angle, presence or absence and content of abnormality, driving operation state, position and inclination of power seat, door lock state, and states of other devices mounted on the mobile body, and the like. The mobile body state detection unit 243 supplies data indicating a result of the detection process to the situation recognition unit 252 of the situation analysis unit 233 and the operation control unit 235.

The self-position estimation unit 232, the situation analysis unit 233, the planning unit 234, and the operation control unit 235 are components corresponding to the self-position estimation unit 132, the situation analysis unit 133, the planning unit 134, and the operation control unit 135 of FIG. 5, respectively, and thus description thereof are omitted. However, in the situation analysis unit 233 of FIG. 6, the component corresponding to the traffic rule recognition unit 152 is deleted.

<Configuration Example of Situation Recognition Unit>

Figure 7:
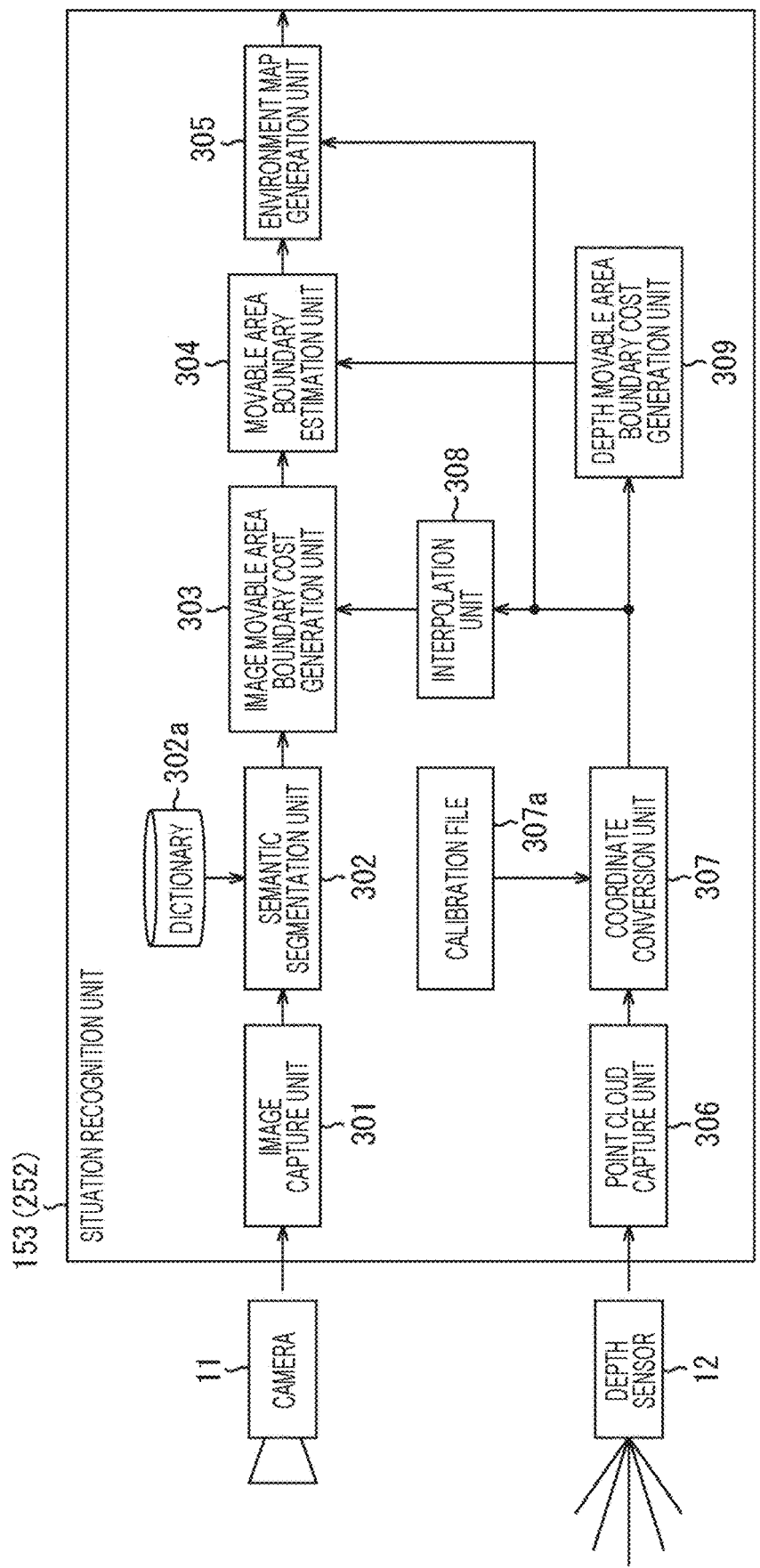
FIG. 7 is a diagram describing a configuration example of a situation recognition unit in FIG. 5 or 6.

Next, with reference to FIG. 7, a configuration example of the situation recognition unit 153 in FIG. 5 will be described. Note that the situation recognition unit 153 of FIG. 5 corresponds to the situation recognition unit 252 of FIG. 6, and thus description thereof is omitted.

As described above, the situation recognition unit 153 generates a local map (hereinafter, also referred to as an environment map (or a situation recognition map)) used for recognizing a situation around the mobile body on the basis of the image captured by the camera 11 including a monocular camera, and the point cloud information detected by the depth sensor 12 such as a LiDAR (Light Detection and Ranging, Laser Imaging Detection and Ranging), a ToF sensor, or a stereo camera among detection results of the data obtaining unit 102. The environment map (situation recognition map) includes, for example, an occupancy grid map.

More specifically, the situation recognition unit 153 includes an image capture unit 301, a semantic segmentation unit 302, an image movable area boundary cost generation unit 303, a movable area boundary estimation unit 304, an environment map generation unit 305, a point cloud capture unit 306, a coordinate conversion unit 307, an interpolation unit 308, and a depth movable area boundary cost generation unit 309.

The image capture unit 301 captures (takes in) an image captured by the camera 11, performs image correction such as lens distortion removal, and then outputs the image to the semantic segmentation unit 302.

The semantic segmentation unit 302 classifies the type of a subject in units of pixels for the captured image by the semantic segmentation on the basis of the image supplied from the image capture unit 301, gives a semantic label corresponding to a classification result, and outputs the image to the image movable area boundary cost generation unit 303. At this time, the semantic segmentation unit 302 appropriately reads out and uses necessary information from a dictionary 302a in which information obtained by machine learning such as deep learning is stored. Note that details of the semantic segmentation will be described later with reference to FIG. 8.

The point cloud capture unit 306 captures (obtains) the point cloud information supplied from the depth sensor 12, and outputs the information to the coordinate conversion unit 307 as a distance image (depth image).

The coordinate conversion unit 307 converts the coordinate system in a space of each point forming the distance image detected by the viewpoint of the depth sensor 12 into the coordinate system of the viewpoint of the camera 11, and outputs the distance image to the environment map generation unit 305, the interpolation unit 308, and the depth movable area boundary cost generation unit 309. When converting a coordinate system, the coordinate conversion unit 307 converts the coordinate system using information of a calibration file 307a in which information obtained by calibration is recorded. Note that the conversion of the coordinate system will be described later in detail with reference to FIG. 9.

The depth movable area boundary cost generation unit 309 generates a depth movable area boundary cost using the distance image converted into the coordinate system of the camera 11, and outputs the depth movable area boundary cost to the movable area boundary estimation unit 304.

Here, the depth movable area boundary cost represents a possibility that the boundary between a road surface, a plane, or the like that is a movable area and an area other than the movable area exists from information of the distance image based on the point cloud information detected by the depth sensor 12, as a distribution of cost for every position in the distance image. Note that the depth movable area boundary cost will be described later in detail with reference to FIGS. 10 and 11.

The interpolation unit 308 uses the distance image converted into the coordinate system of the camera 11 to interpolate and generate distance information between respective points forming the distance image, to thereby generate a distance image including distance information in units of pixels having a substantially same resolution as the image captured by the camera 11, and outputs the distance image to the image movable area boundary cost generation unit 303.

The image movable area boundary cost generation unit 303 generates an image movable area boundary cost on the basis of information of the semantic label in units of pixels supplied from the semantic segmentation unit 302 and the distance information in units of pixels of the coordinate system having the same resolution and at the same position as the image captured by the camera 11 supplied from the interpolation unit 308, and outputs the image movable area boundary cost to the movable area boundary estimation unit 304.

Here, the image movable area boundary cost represents a distribution of the possibility that the boundary between the road surface that is the movable area and another area exists as a cost for every position in the image, on the basis of the semantic label that is a result of the semantic segmentation of the image captured by the camera 11. Note that the image movable area boundary cost will be described later in detail with reference to FIG. 12.

The movable area boundary estimation unit 304 estimates a movable area boundary on the basis of the image movable area boundary cost supplied from the image movable area boundary cost generation unit 303, and the depth movable area boundary cost supplied from the depth movable area boundary cost generation unit 309, and supplies an estimation result to the environment map generation unit 305. At this time, the movable area boundary estimation unit 304 also supplies a classification result of the semantic labels in units of pixels and information of the distance image together to the movable area boundary estimation unit 304. Note that the method for estimating the movable area boundary based on the image movable area boundary cost and the depth movable area boundary cost will be described later in detail with reference to FIG. 13.

The environment map generation unit 305 generates and outputs an environment map on the basis of information of the movable area boundary supplied from the movable area boundary estimation unit 304, information of the semantic label in units of pixels, and the distance image including the coordinate-converted point cloud information supplied from the coordinate conversion unit 307.

Details of a method for generating the environment map based on the information of the movable area boundary, the distance image in units of pixels, and the information of the semantic label will be described later with reference to FIGS. 14 and 15.

<Semantic Segmentation>

Next, with reference to FIG. 8, the semantic segmentation by the semantic segmentation unit 302 will be described.

Figure 8:
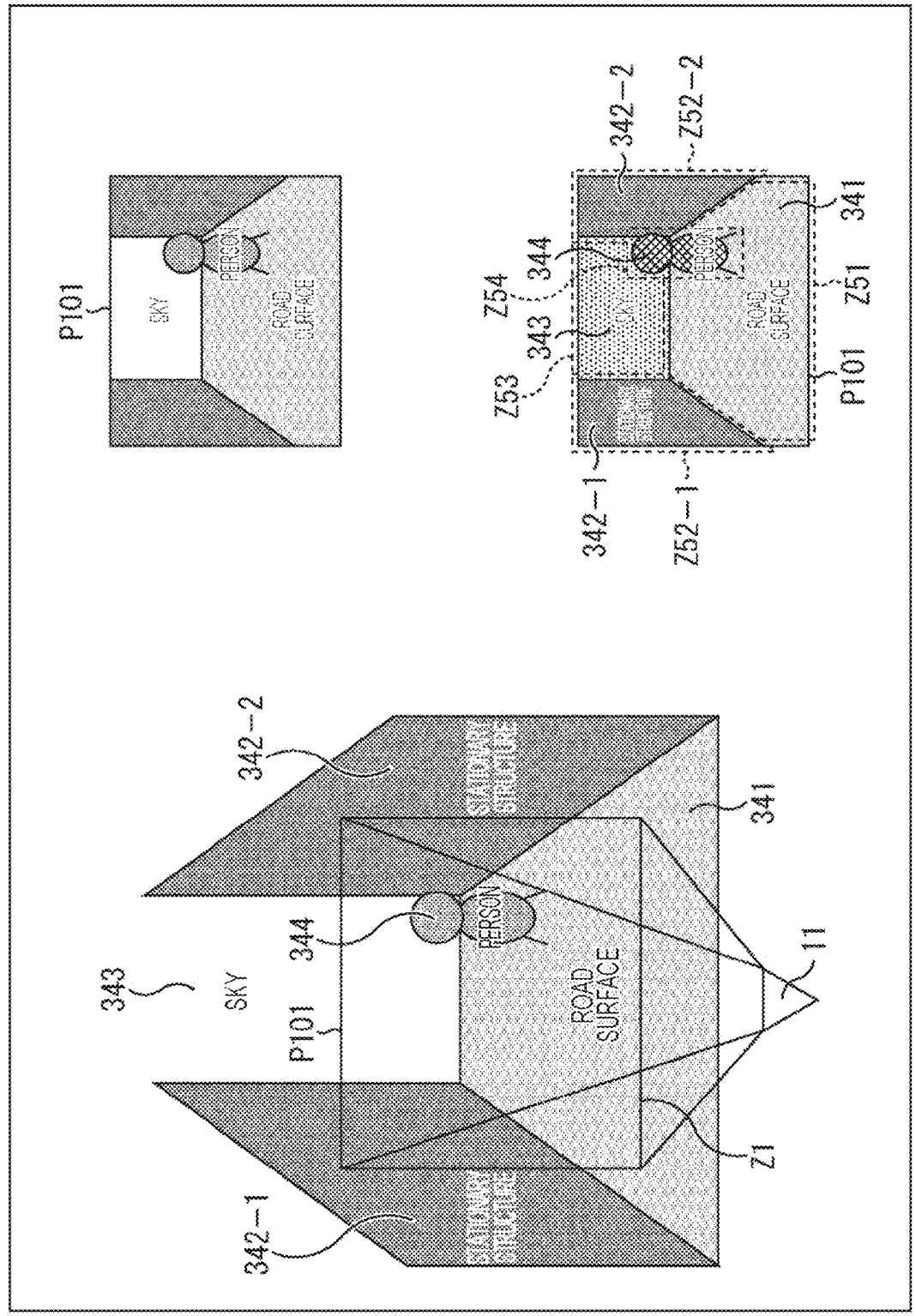
FIG. 8 is a diagram describing semantic segmentation.

For example, let us consider that, as illustrated in a left part of FIG. 8, the camera 11 captures an image P101 at an angle of view Z1 so that there is a road surface 341 in a space sandwiched from left and right between stationary structures 342-1 and 342-2, a person 344 exists on the road surface 341, and a sky 343 can be seen in the back.

By machine learning such as deep learning, the semantic segmentation unit 302 identifies and classifies a subject in the image P101 in units of pixels on the basis of the image P101 as illustrated in an upper center of FIG. 8, and gives a semantic label (performs labeling to a semantic label).

In a case of the image P101 illustrated in an upper right part of FIG. 8, for example, the image is classified and labeled by the semantic segmentation as illustrated in the labeling image P101 in a lower right part of FIG. 8.

That is, in a labeling image P102, each pixel belonging to an area Z51 in the lower part of the image is classified as the road surface 341, pixels belonging to areas Z52-1 and Z52-2 are classified as the left and right stationary structures 342-1 and 342-2, respectively, pixels belonging to an area Z53 are classified as the sky 343 above the back, and pixels that belong to an area Z54 are classified as the person 344.

In addition to the example of FIG. 8, the semantic segmentation unit 302 identifies, for example, the road surface, stationary structures (walls, guardrails, trees, utility poles, and the like), vehicles (automobiles, trucks, buses, and the like), two-wheeled vehicles (motorcycles, bicycles), people, horizontal bars (railroad crossings, ETC bars, parking gate bars), and the sky in units of pixels on the basis of the image, and labels them with the semantic label.

<Coordinate Conversion of Distance Image>

The point cloud information, which is a measurement result of the depth sensor 12, is coordinate information of a point group in a three-dimensional space, but in order to make the positional relationship of the coordinate system correspond so that this measurement result can be superimposed on the image captured by the camera 11, it is necessary to convert the coordinate system in the point cloud information into the coordinate system of the camera 11.

Figure 9:
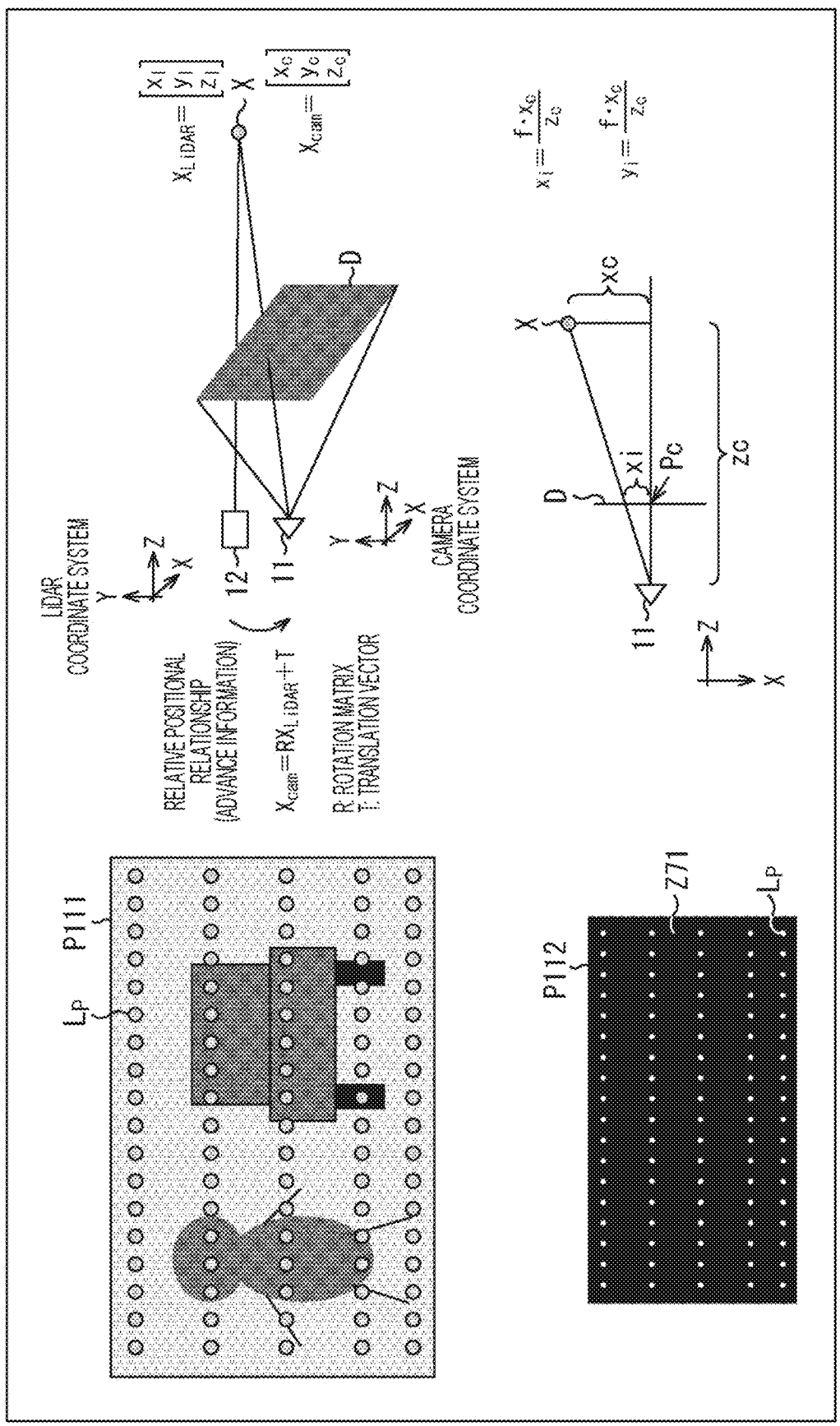
FIG. 9 is a diagram describing coordinate conversion of a distance image.

For example, a distance image corresponding to the image P111 is generated by superimposing a distance measurement result for every light projecting direction Lp of the depth sensor 12 on the image P111 captured by the camera 11 illustrated in an upper left part of FIG. 9. However, the coordinate system of the image captured by the camera 11 and the coordinate system of the distance image detected by the depth sensor 12 do not become the same coordinate system because the respective viewpoints of the camera 11 and the depth sensor 12 are different. Therefore, even if the distance information, which is the distance measurement result for every light projecting direction Lp of the depth sensor 12, is simply superimposed on the image captured by the camera 11, the information is superimposed in a shifted state in units of pixels.

The coordinate conversion unit 307 obtains the calibration file 307a including information of relative positions of the depth sensor 12 and the camera 11 and information of an image center and a focal length of the camera 11 as advance information, and uses the information in this calibration file 307a so as to convert the coordinate system of the distance image by a calculation as follows.

First, the coordinate conversion unit 307 converts the coordinate system of the depth sensor 12 including a LiDAR into the coordinate system of the camera 11.

That is, as illustrated in an upper right part of FIG. 9, the relative positional relationship of coordinates $X_{LiDAR}$ (=transposed matrix of $[x_l, y_l, z_l]$), which is the coordinate system of the depth sensor 12, and coordinates $X_{cam}$ (=transposed matrix of $[x_c, y_c, z_c]$) on an imaging plane D of the coordinate system of the camera 11 is known as advance information by calibration, and is obtained as, for example, the following equation (1).

$$X_{cam} = RX_{LiDAR} + T \quad (1)$$

Here, R is a rotation matrix indicating the rotation between the depth sensor 12 and the camera 11 which is known in advance by calibration, and T is a translation vector which is also known in advance by calibration.

By calculating the above-described formula (1), coordinates of a point X of the distance measurement result measured as the information of the coordinate system of the depth sensor 12 are converted into the camera coordinate system.

Next, the coordinate conversion unit 307 associates the distance measurement result of the depth sensor 12 with the coordinate system on the imaging surface of the camera 11.

That is, when the position $X_{cam}$ (=$[x_c, y_c, z_c]$ transpose) of the obstacle detected by the depth sensor 12 including LiDAR is obtained, as illustrated in a lower right part of FIG. 9, an xi coordinate in an image plane based on an image center Pc of the imaging plane D of an object in the imaging plane D can be obtained as the following formula (2).

$$xi = f \times xc/zc \quad (2)$$

Here, f is the focal length of the camera 11.

Further, similarly, a yi coordinate can be calculated by the following formula (3).

$$yi = f \times yc/zc \quad (3)$$

As a result, the position of the object on the imaging plane D can be identified.

That is, the coordinates $X_{LiDAR}$ (=$[x_l, y_l, z_l]$) of points of the point cloud information (distance image) detected by the depth sensor 12 are converted into coordinates $X_{cam}$ (=$[x_c, y_c, z_c]$) of three-dimensional points in the coordinate system of the camera 11 on the basis of the light projecting direction. Moreover, the coordinates (xi, yi) on the imaging plane centered on the imaging plane D corresponding to the coordinates $X_{cam}$ (=$[x_c, y_c, z_c]$) of three-dimensional points in the coordinate system of the camera 11 are calculated with formulas (2) and (3) on the basis of the focal length f of the camera 11.

Through this processing, the coordinate conversion unit 307 generates a distance image P112 as illustrated in a lower left part of FIG. 9.

The distance image P112 has the same pixel arrangement as the image of the camera 11, and in a case where it is in the light projecting direction of the depth sensor 12 and there is distance information among the respective pixels (xi, yi) by the conversion of the coordinate system described above, distance data (zc in the lower right part of FIG. 9) is stored in association, and in a case where it is not in the light projecting direction and there is no distance information, for example, zero is stored as data of the distance.

<Depth Movable Area Boundary Cost>

Next, the depth movable area boundary cost will be described with reference to FIG. 10.

The depth movable area boundary cost represents a distribution of the possibility that a movable area boundary based on the distance image detected by the depth sensor 12 exists as a cost for every position in the distance image.

Figure 10:
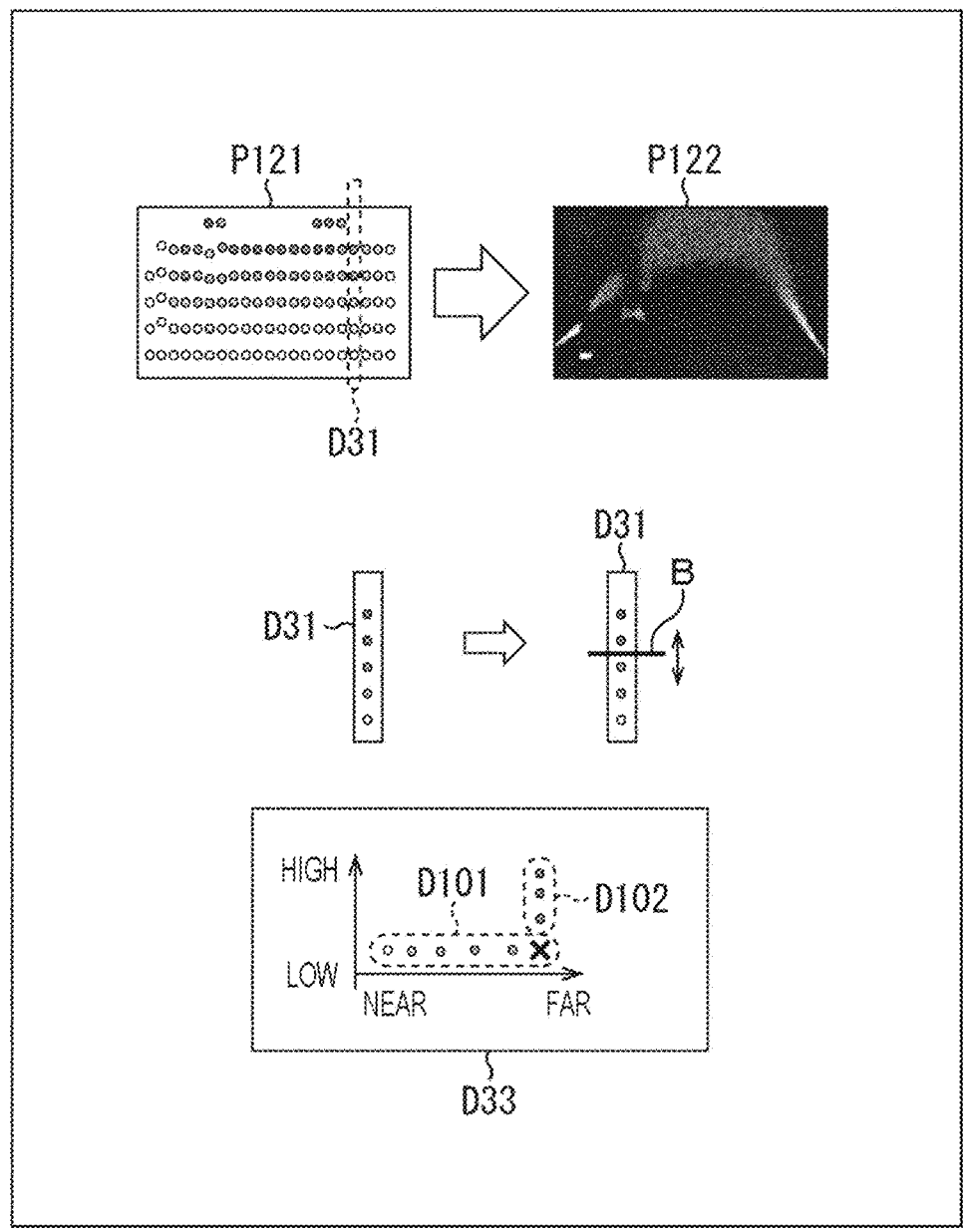
FIG. 10 is a diagram describing a depth movable area boundary cost.

For example, let us consider a case where a distance image P121 as illustrated on an upper left side of FIG. 10 is detected by the depth sensor 12. Note that circles in the distance image P121 indicate positions on coordinates corresponding to the image taken by the camera 11, for which laser for distance measurement is emitted, reflected light from a subject is measured, and a distance is measured from the round-trip time thereof. However, the resolution of the distance image P121 is lower than the resolution of the image captured by the camera 11.

In order to obtain a boundary between the movable area of the mobile body and an area other than the movable area in the distance image P121, the depth movable area boundary cost generation unit 309 extracts, for example, distance information D31 in units of columns from the distance image P121 as illustrated in a middle left side of FIG. 10.

Note that in the following, the distance information D31 in units of columns is simply referred to as column unit distance information D31.

In this case, for each piece of the column unit distance information D31, when there is a boundary in any of them, the boundary B exists in any of the column unit distance information D31 as illustrated in a middle right side of FIG. 10. Accordingly, the depth movable area boundary cost generation unit 309 estimates the movable area boundary in the distance image P121 by obtaining the boundary B of the column unit distance information D31 of each column in the distance image P121.

More specifically, since each piece of the distance information that constitutes the column unit distance information D31 is point cloud information, coordinates in a three-dimensional space are obtained. Accordingly, the depth movable area boundary cost generation unit 309 generates a distribution D33 in which a horizontal axis is distance and a vertical axis is height, as illustrated in a lower part of FIG. 10, on the basis of each piece of distance information constituting the column unit distance information D31.

An area 2101 having a low height and a continuously changing distance as illustrated by the distribution D33 in the lower part of FIG. 10 can be regarded as a flat movable area. Furthermore, an area D102 having a changing height and a constant distance can be regarded as an area in which some obstacle exists and which is not a movable area.

Accordingly, the depth movable area boundary cost generation unit 309 assumes that the position indicated by a cross in the diagram, where the area D101 that can be regarded as a movable area from the distribution D33 and the area D102 that can be regarded as an area other than the movable area intersects, is the boundary between the movable area and the area other than the movable area.

Then, for each column in the distance image P121, the depth movable area boundary cost generation unit 309 extracts the column unit distance information D31 to generate the distribution D33, and sequentially obtains positions corresponding to the cross in the lower part of FIG. 10, to thereby obtain the boundary between the movable area and the other area for all columns.

Moreover, the depth movable area boundary cost generation unit 309 sets the cost according to respective distances of positions to be the boundary of the movable area obtained. That is, in the distance image detected by the depth sensor 12, reliability of the depth sensor 12 is higher as the distance is nearer, and reliability of the depth sensor 12 is lower as the distance is farther, as described with reference to FIG. 3. Therefore, the depth movable area boundary cost generation unit 309 obtains a cost distribution P122 as illustrated in the upper right side of FIG. 10.

That is, in a case where the image captured by the camera 11 is like the image P31 in FIG. 4, at the position of the boundary B1 with the road surface 31 which is the movable area, the cost is set lower to indicate a higher possibility of being the boundary as the distance is nearer (depicted in color close to white as the distance is nearer), and the cost is set higher to indicate a lower possibility of being the boundary as the distance is farther (depicted in color close to black as the distance is farther).

As a result, as illustrated by the cost distribution P122, the distribution of a cost that is estimated on the basis of the distance image and that indicates the possibility that the boundary of the movable area exists will be the depth movable area boundary cost.

In other words, the depth movable area boundary cost represents an area in which the boundary of the movable area estimated on the basis of the distance image exists in the distribution of the possibility called cost.

<Specific Method for Obtaining Depth Movable Area Boundary Cost>

Here, with reference to FIG. 11, a specific method for obtaining the depth movable area boundary cost in a case where the distribution D33 based on the column unit distance information D31 is used will be described.

(First Obtaining Method)

Figure 11:
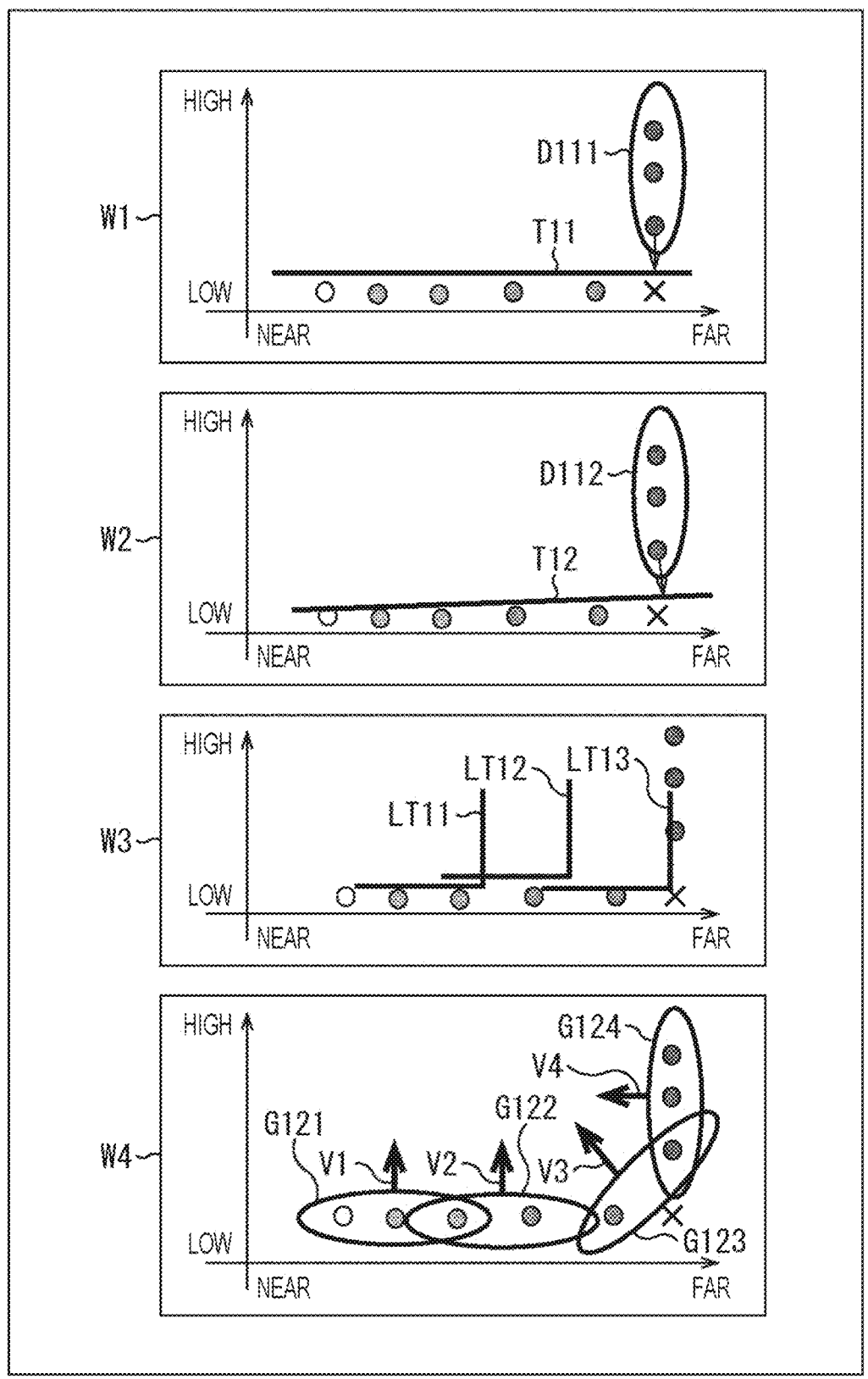
FIG. 11 is a diagram describing a specific method for obtaining the depth movable area boundary cost.

A first obtaining method is such that, first, as illustrated in a distribution W1 (corresponding to the distribution D33) at a top of FIG. 11, the depth movable area boundary cost generation unit 309 sets a predetermined height T11 corresponding to the height of the road surface 31 as a height of the movable area. Then, the depth movable area boundary cost generation unit 309, on the basis of the distribution W1 of the column unit distance information D31, adds the distribution for every distance with respect to a distribution of positions higher than the predetermined height T11, and sets an inverse number of the addition result as an added cost. In the distribution W1 of FIG. 11, since the addition result by the distribution of an area D111 that can be regarded as an obstacle is the largest, the added cost at a position in the area D111 (the position of a cross in the diagram) is the minimum, and thus it can be considered as a boundary of the movable area.

Therefore, in this case, the added cost is set on the basis of distance information at a position regarded as the boundary of the movable area in each column.

Furthermore, a distance cost according to the distance in the column unit distance information D31 is further set, and the distance cost is set smaller to indicate a higher possibility that the boundary exists as the distance is nearer, and the distance cost is set larger to indicate a lower possibility that the boundary exists as the distance is farther.

Then, the depth movable area boundary cost generation unit 309 finally obtains the depth movable area boundary cost in units of pixels on the basis of the added cost and the distance cost, for example, by the product of the added cost and the distance cost.

(Second Obtaining Method)

A second obtaining method is such that, first, as illustrated in a distribution W2 (corresponding to the distribution D33) located second row from the top of FIG. 11, the depth movable area boundary cost generation unit 309 sets a plane T12 corresponding to the road surface 31 that is the movable area is set by plane fitting on the basis of the distribution W2 of the column unit distance information D31. Then, the depth movable area boundary cost generation unit 309 adds the distribution for every distance with respect to a distribution of positions higher than the plane T12 in the distribution W2, and sets an inverse number of an addition result as an added cost. In the distribution W2 of FIG. 11, since the addition result by the distribution of an area D112 that can be regarded as an obstacle is the largest, the added cost at a position in the area D111 (the position of a cross in the diagram) is the minimum, and thus it can be considered as a boundary of the movable area.

Furthermore, the depth movable area boundary cost generation unit 309 sets the distance cost similarly to the first obtaining method, and finally obtains the depth movable area boundary cost in units of pixels on the basis of the added cost and the distance cost, for example, by the product of the added cost and the distance cost.

(Third Obtaining Method)

A third obtaining method is such that, as illustrated in a distribution W3 (corresponding to the distribution D33)

located third row from the top of FIG. 11, the depth movable area boundary cost generation unit 309 fits an L-shaped model (a key-shaped model with a predetermined length in the horizontal direction and a predetermined height in the vertical direction) LT11 at a nearest position so that a corner of the L-shape is far, and a portion of a horizontal side of the L-shape is on a plane portion that is the movable area in the distribution W3. The cost of distance (hereinafter simply referred to as a distance cost) at this time is set to the minimum value.

Then, the depth movable area boundary cost generation unit 309 determines, on the basis of the distribution W3 of the column unit distance information D31, whether or not the distribution exists at a position higher than the horizontal side of the L-shaped model within the range of a horizontal side length of the L-shaped model. Here, as illustrated by the L-shaped model LT11, when the distribution does not exist at a position higher than the horizontal side, the depth movable area boundary cost generation unit 309 increments the distance cost by a predetermined value, for example, to shift the L-shaped model away by the predetermined value as indicated by an L-shaped model LT12. Then, the depth movable area boundary cost generation unit 309 determines whether or not the distribution exists at a position higher than the horizontal side of the L-shaped model within the range of the horizontal side length of the L-shaped model, and repeats a similar process.

That is, if a state that the distribution does not exist at a position higher than the horizontal side of the L-shaped model is repeated, the distance gradually becomes far, and a similar process is repeated while increasing the distance cost.

Here, in a case as illustrated by an L-shaped model LT13, on the basis of the distribution of the column unit distance information D31, the distribution exists at a position higher than the horizontal side of the L-shape within the range of the horizontal side of the L-shape, the depth movable area boundary cost generation unit 309 regards the position of the corner of the L-shaped model LT13 (cross in the diagram) at this position as a candidate for the boundary of the movable area. At this time, the depth movable area boundary cost generation unit 309 calculates a variation in the vertical side of the L-shaped model LT13 and the distribution of the distribution W3 as a variation cost.

The variation cost is set to a value that is smaller as the variation is smaller and is likely to be the boundary of the movable area, and conversely is set to a value that is less likely to be the boundary of the movable area as the variation is larger.

Then, the depth movable area boundary cost generation unit 309 sets, for example, a mutual product as a total cost on the basis of the distance cost and the variation cost, and obtains a position and a distribution of the total cost using the L-shaped model for every entire column. Note that since the variation cost is obtained only when the distribution exists at a position higher than the horizontal side of the L-shape, the variation cost is set to the maximum value in a case where the distribution does not exist at a position higher than the horizontal side of the L-shape, and the variation cost cannot be obtained.

Consequently, a fitting variation using the L-shaped model and the distribution of the cost according to the distance are obtained for every column in the distance image. That is, in this case, a cost distribution in units of columns, that is, a cost distribution as a probability distribution for every position where a boundary of the movable area exists in units of columns is obtained, and by obtaining in all columns, the cost distribution (distribution of the possibility that the boundary of the movable area exists) at each point (each pixel) of the distance image is obtained.

(Fourth Obtaining Method)

A fourth obtaining method is such that, first, as illustrated by the distribution W4 located fourth row from the top of FIG. 11, a group is set for each of a plurality of adjacent distributions among respective distributions in the column unit distance information D31, a belonging plane is obtained in units of groups, a normal to the plane for every group is obtained, and a cost according to an angle formed by the normal and a horizontal vector is set as a possibility that the boundary of the movable area exists.

That is, in the distribution W4 located fourth row from the top of FIG. 11, the depth movable area boundary cost generation unit 309 sets, among the column unit distance information D31, groups G121 to G124 including distance information of three or more adjacent points for which a plane can be obtained, and obtains plane normal vectors V1 to V4 obtained on the basis of the distance information of each group. In a case where the normal vector of each group is the horizontal vector, it can be regarded as a normal vector of a surface formed by an obstacle. That is, in the distribution W4, the distance to the plane formed by the group G124 in which the plane is set can be regarded as the boundary of the movable range.

Therefore, the depth movable area boundary cost generation unit 309 uses, for the vectors V1 to V4 of the groups G121 to G124 of the distribution W4, a value corresponding to the angle formed with the horizontal vector, for example, the inverse number of an inner product as a normal cost, and thereby sets a cost distribution thereof for every column and obtains the cost distribution for all columns.

Then, the depth movable area boundary cost generation unit 309 sets the distance cost similarly to the first obtaining method, and finally obtains the depth movable area boundary cost in units of pixels on the basis of the normal cost and the distance cost, for example, by the product of the normal cost and the distance cost.

<Image Movable Area Boundary Cost>

Next, the image movable area boundary cost will be described with reference to FIG. 12.

The image movable area boundary cost is obtained on the basis of the image captured by the camera 11 and the distance image detected by the depth sensor 12.

Figure 12:
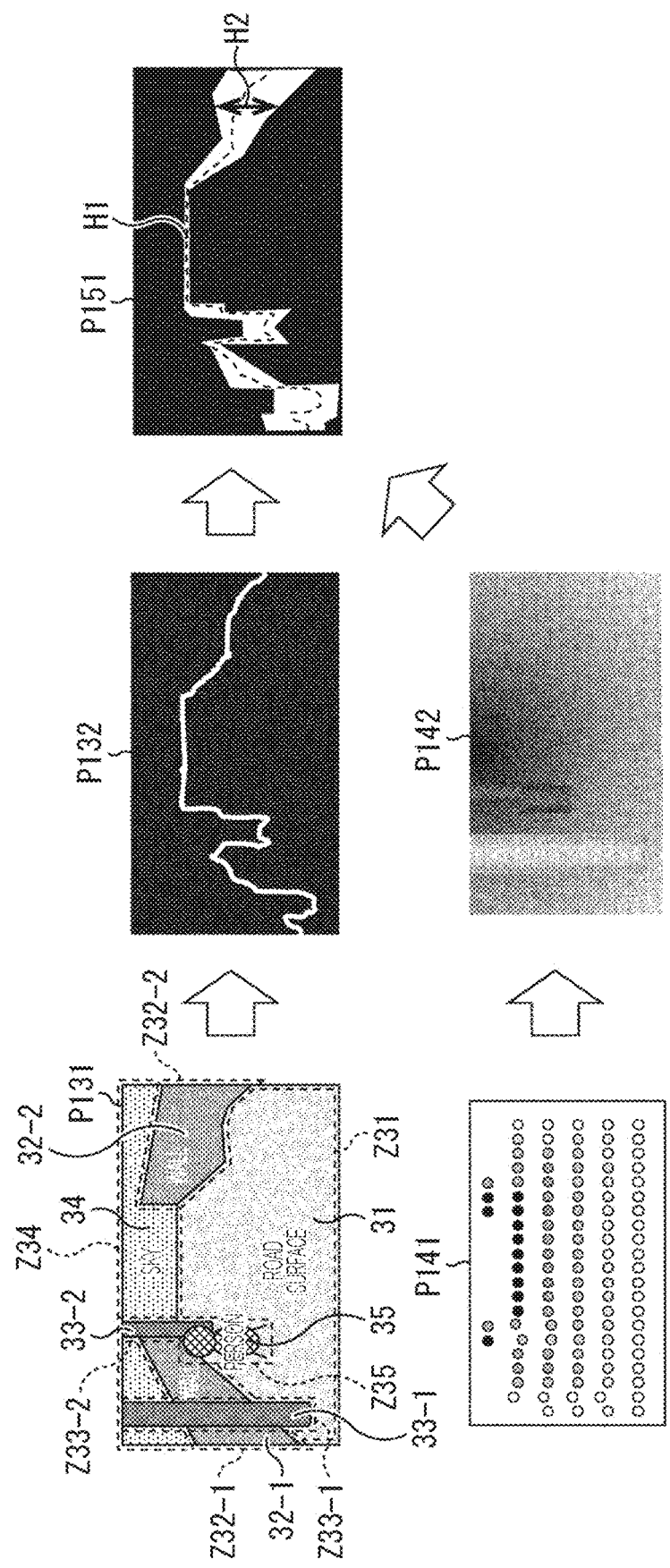
FIG. 12 is a diagram describing an image movable area boundary cost.

Here, let us consider a case where the semantic segmentation unit 302 supplies a labeling result of the semantic segmentation as illustrated by the image P131 of FIG. 12 from the image captured by the camera 11, for example.

In such a case, the image movable area boundary cost generation unit 303 obtains a boundary between the area Z31 of the road surface 31 which is the boundary of the movable area and the other area as illustrated in the image P132 of FIG. 12. Note that the image P132 illustrates the cost distribution based on the semantic label, the cost is lower and depicted in color close to white as the possibility of being a boundary of the movable area is higher, and the cost is higher and depicted in color close to black as the possibility of being another area is higher. That is, in the image P132, the distribution itself is such that the boundary of the area Z31 of the road surface 31 is represented in white.

Further, at this time, the interpolation unit 308 generates a distance image P142 having the same resolution as the image captured by the camera 11 by interpolation using a distance image P141 detected by the depth sensor 12 that has been coordinate-converted into the coordinate system of the camera 11, and outputs the distance image P142 to the image movable area boundary cost generation unit 303.

Then, the image movable area boundary cost generation unit 303 gives a vertical width H corresponding to the distance in the distance image P142 to a white area with a lowest cost regarded as the boundary of the movable area in the image P132, to thereby generate an image movable area boundary cost image P151.

That is, near a center of the image movable area boundary cost image P151, since the distance in the distance image P142 is far from a white line portion in the image P132 depicted with a dotted line, the vertical width H1 of a white line with a small cost is set small. This is because as the distance is farther, accuracy of the depth sensor 12 decreases and it is necessary to assume reliability of cost based on the camera 11 higher, and thus the influence of the image movable area boundary cost based on the semantic label is increased more.

On the other hand, near left and right ends of the image movable area boundary cost image P151, in the distance image P142, the distance is near to the white line portion in the image P132 depicted with a dotted line, and thus a width H2 of a white line with a smaller cost is set large. This is because as the distance is nearer, the accuracy of the depth sensor 12 is higher, and thus it is made easily influenced by the depth movable area boundary cost and the influence of the image movable area boundary cost based on the semantic label is suppressed.

That is, as the image movable area boundary cost, a nearer range (narrow range) to the boundary of the movable area obtained with the semantic label is set as the distance is farther on the basis of the boundary of the movable area obtained with the semantic label and the information of distance in units of pixels obtained from the distance image, and a wider range is set to the boundary of the movable area obtained with the semantic label so as to make it easily influenced by the depth movable area boundary cost as the distance is nearer.

Consequently, as illustrated by the cost distribution P151, the distribution of a cost indicating the possibility that the boundary of the movable area exists, which is estimated on the basis of the semantic label set according to the subject of the image and the distance image, is obtained as the image movable area boundary cost.

In other words, the image movable area boundary cost is such that the area in which the boundary of the movable area that is estimated on the basis of the semantic label and the distance image exists is represented by the distribution of the possibility that the boundary exists that is called cost.

Note that, here, an example has been described in which the binarization process is performed to set a minimum cost indicating that it is highly possible that the boundary exists in the range defined by the width H, and set a maximum cost in a range other than that, the cost may be changed according to the distance from the boundary of the movable area obtained with the semantic label. For example, for the vertical width H, as the distance from the boundary of the movable area obtained with the semantic label becomes far, the cost may be increased and the cost at the boundary of the movable area obtained with the semantic label may be minimized.

<Method for Estimating Movable Area Boundary>

Next, with reference to FIG. 13, a method for estimating a movable area boundary based on the depth movable area boundary cost and the image movable area boundary cost will be described.

A case will be described where a depth movable area boundary cost P181 of FIG. 13 corresponding to the depth movable area boundary cost P122 described with reference to FIG. 10 and an image movable area boundary cost P171 corresponding to the image movable area boundary cost P151 described with reference to FIG. 12 are supplied to the movable area boundary estimation unit 304.

In this case, the movable area boundary estimation unit 304 extracts column costs D51 and D61 for each column of each of the depth movable area boundary cost P181 and the image movable area boundary cost P171 in the vertical direction V in the diagram.

Moreover, the movable area boundary estimation unit 304 generates column cost distributions D52 and D62 on the basis of the extracted column costs D51 and D61.

Figure 13:
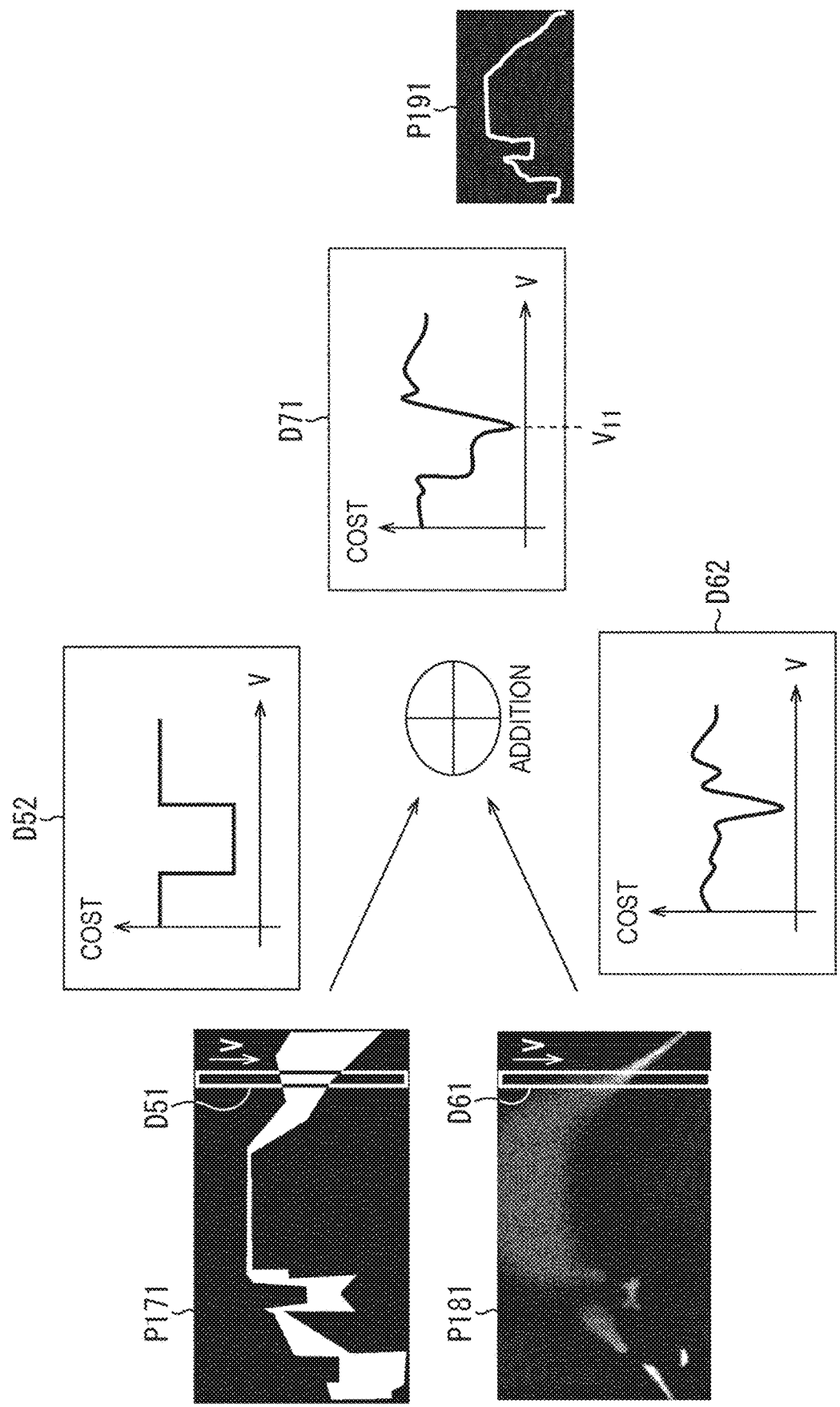
FIG. 13 is a diagram describing a method for estimating a movable area boundary.

For example, in a case of the image movable area boundary cost P171 in FIG. 13, the column cost distribution D52 has a minimum cost in an area represented in white and indicating that there is a high possibility that a boundary exists, and a maximum cost represented in black and indicating that there is a low possibility that the boundary exists, thereby obtaining a rectangular distribution. That is, the image movable area boundary cost P171 is a rectangular distribution in any column cost distribution by setting the vertical width according to the distance with respect to a boundary pixel set on the basis of the semantic label, but it is unclear as to which of the widths that are set according to the distance the boundary exists.

Further, in a case of the depth movable area boundary cost P181 of FIG. 13, the column cost distribution D62 has a low cost indicating that there is a high possibility that the boundary exists as the color is closer to white, and a high cost indicating that there is a low possibility that the boundary exists as the color is closer to black, thereby obtaining a curved distribution. That is, the depth movable area boundary cost P181 has a curved waveform due to fluctuations that occur according to variations in the distance image.

The movable area boundary estimation unit 304 generates an integrated column cost D71 by adding the column cost distributions D52 and D62, and assumes a vertical position V11 having a lowest cost as an optimal boundary of the movable area, that is, an optimum boundary position. Note that a dynamic programming method or the like may be used as a means for calculating the optimal boundary position that minimizes the cost.

The movable area boundary estimation unit 304 generates an estimation result P191 of the movable area boundary by obtaining the integrated column cost D71 for each column and obtaining the optimum boundary position. Note that in the estimation result P191, a white portion is the boundary of the movable area, that is, a portion below the white portion in the estimation result P191 is the movable area, and a portion above the white portion is an area other than the movable area.

Note that, for example, for the vertical width H, by increasing the cost as the distance from the boundary of the movable area obtained with the semantic label becomes far, and minimizing the cost at the boundary of the movable area obtained with the semantic label, the column cost distribution D52 may be set as, for example, a convex or concave curved shape instead of the rectangular shape.

<Method for Generating Environment Map>

Next, a method for generating an environment map will be described with reference to FIG. 14.

Figure 14:
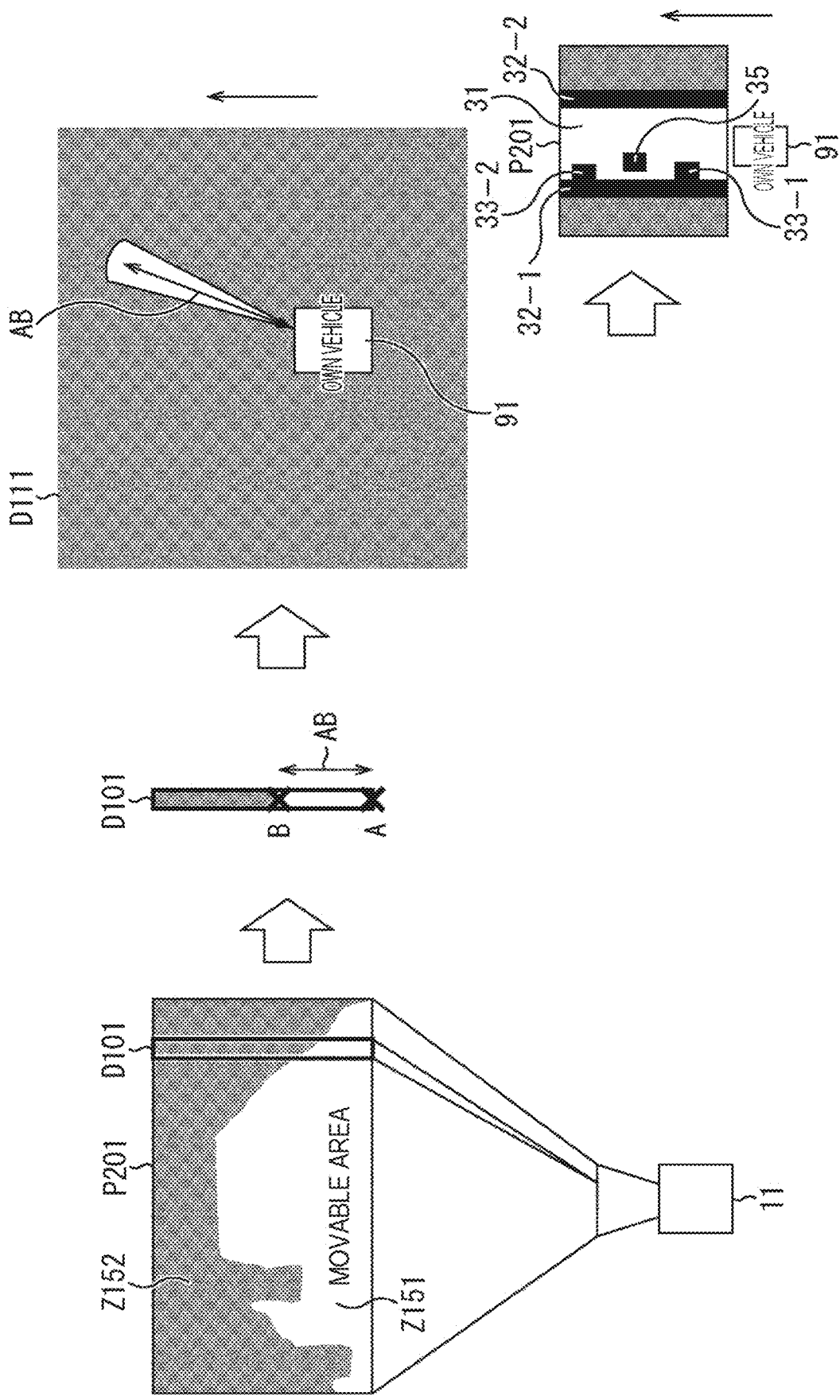
FIG. 14 is a diagram describing a method for generating an environment map.

The environment map generation unit 305 extracts a column unit distribution D101 for every horizontal angle viewed from the camera 11 in units of columns in a case where, for example, an estimation result P201 of a movable area boundary as illustrated in a left part of FIG. 14 is supplied.

Here, in the estimation result P201 of the movable area boundary in FIG. 14, a lower area 2151 is the movable area, an upper area 2152 is an area other than the movable area, and a boundary thereof is an estimation result of the movable area boundary.

Therefore, the column unit distribution D101 to be extracted, as illustrated in a center portion of FIG. 14, the distance from a position A of a lower end of the movable area at a predetermined horizontal angle to a position B of the boundary can be regarded as a distance AB from the mobile body to the obstacle.

Accordingly, as illustrated in an upper right part of FIG. 14, the environment map generation unit 305 plots on the environment map D111 the position of the distance AB at a predetermined horizontal angle as the boundary of the movable area. The environment map generation unit 305 generates an environment map P211 as illustrated in a lower right part of FIG. 14 by repeating a similar process for all horizontal angles with respect to the estimation result P201 of the movable area boundary.

Note that the environment map P211 in the lower right part of FIG. 14 illustrates an example of arrangement of obstacles in which the front, which is the imaging direction of the camera 11 of the vehicle 91 that is the mobile body, is regarded as an upper side in the diagram, and the traveling direction of the mobile body is viewed from above.

<Method for Obtaining Distance AB>

Next, a method for obtaining the distance AB using the above-mentioned column unit distribution D101 will be described.

Here, it is assumed that coordinates of a pixel P on the image captured by the camera 11 is converted into coordinates on a plane S constituting the road surface 31.

Figure 15:
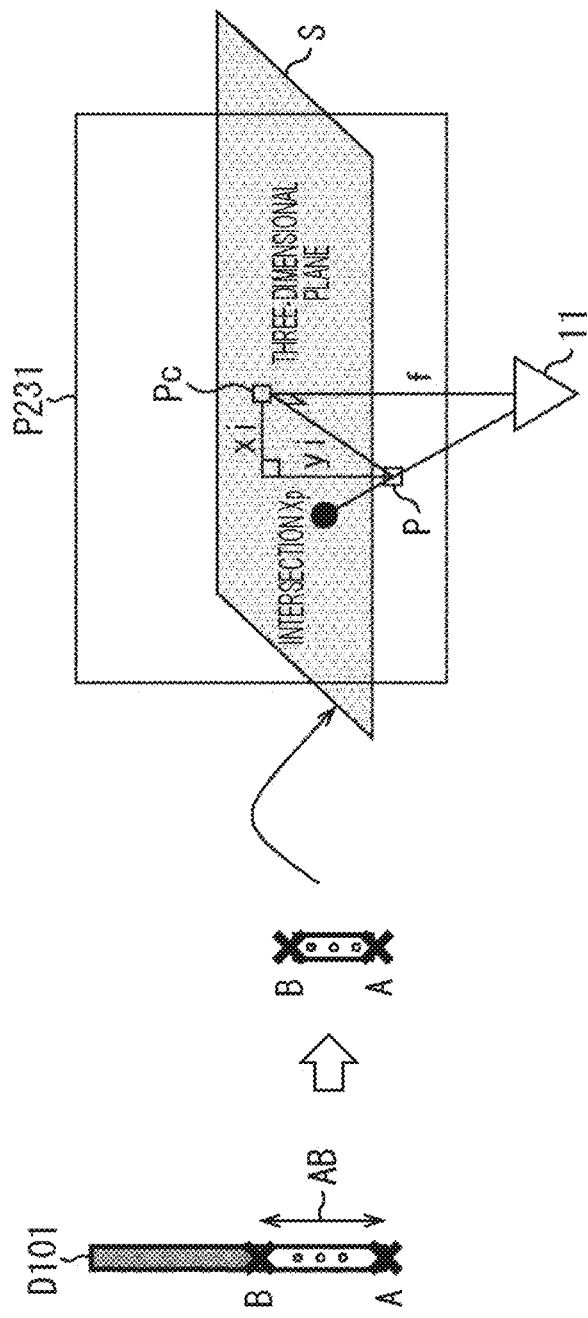
FIG. 15 is a diagram describing a method for calculating a distance when the environment map is generated.

That is, as illustrated in FIG. 15, in a case where the camera 11 captures an image P231, a focus position is assumed to be an image center (center pixel) Pc, and when the image capture position of the camera 11 is a starting point, a line-of-sight vector Ve to the pixel P to be the boundary is (xi, yi, f). Here, xi and yi are pixel positions in the image D captured by the camera 11 when the center pixel Pc is the origin, and f is the focal length when the image center (center pixel) Pc from the camera 11 is the focus position.

At this time, the intersection point Xp corresponding to the pixel P on the plane S constituting the road surface 31 from the viewpoint of the camera 11 is represented by the following formula (4).

[Mathematical Formula 1]

$$\text{INTERSECTION WITH PLANE: } X_p = s \begin{bmatrix} xi \\ yi \\ F \end{bmatrix} \quad (4)$$

Here, s is a coefficient and is a scalar quantity. That is, the vector starting from the camera 11 up to the intersection point Xp is the coefficient s times the line-of-sight vector Ve.

Further, the plane S constituting the road surface is expressed as the following formula (5).

[Mathematical Formula 2]

$$N^T X + d = 0 \quad (5)$$

$$N = \begin{bmatrix} n_x \\ n_y \\ n_z \end{bmatrix} : \text{NORMAL VECTOR}$$

$$X = \begin{bmatrix} x \\ y \\ z \end{bmatrix} : \text{THREE-DIMENSIONAL POINT COORDINATES}$$

$$d : \text{COEFFICIENT}$$

Here, X is coordinates (x, y, z) of a point on the plane S, N is a normal vector (nx, ny, nz) of the plane S, T is the transpose, and d is a coefficient.

That is, for the plane S, the normal vector N and the coefficient d can be obtained by plane fitting such as a least square method or RANSAC, by using distance information of points existing between the position A and the position B in the column unit distribution D101 obtained from the coordinate-converted distance image supplied from the coordinate conversion unit 307 and distance information of points of the movable area in adjacent surrounding columns, and thus the plane S can be identified.

As a result, the plane of the road surface 31 constituted by the plane S can be identified.

Therefore, by substituting the above-described formula (4) into the formula of the plane S constituting the road surface and is defined by the above formula (5), a constant s is obtained, and by obtaining this constant s, the coordinates of the intersection point Xp on the plane S are obtained.

By obtaining, for each of the positions A and B, the pixel P of the boundary with an obstacle on the plane S constituting the road surface 31 obtained in this manner, the distance AB can be obtained.

<Autonomous Driving Control Processing>

Figure 16:
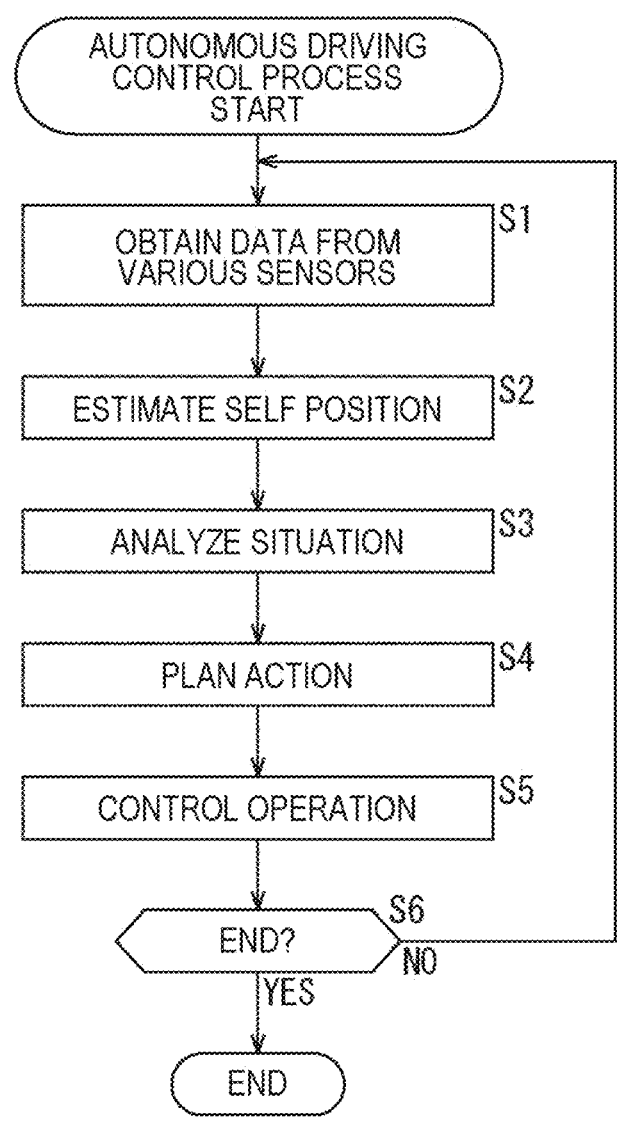
FIG. 16 is a flowchart describing an autonomous driving control process.

Next, an autonomous driving control process in the vehicle control system 100 in FIG. 5 will be described with reference to a flowchart in FIG. 16.

In step S1, the detection unit 131 obtains various data obtained by the data obtaining unit 102, detects data necessary for processing, and outputs the data to the self-position estimation unit 132 and the situation analysis unit 133. That is, here, the image captured by the camera 11 and the point cloud information by the depth sensor 12 which are obtained by the data obtaining unit 102 are detected by the detection unit 131, and are output to the self-position estimation unit 132 and the situation analysis unit 133. Note that in addition to this, various data required for the autonomous driving control process are detected and output to the self-position estimation unit 132 and the situation analysis unit 133.

In step S2, the self-position estimation unit 132 estimates the self-position on the basis of various data from the detection unit 131, and outputs the estimation result to the situation analysis unit 133. At this time, the self-position estimation unit 132 estimates the self-position by using information from the situation analysis unit 133 as necessary.

In step S3, the situation analysis unit 133 analyzes situations of the own vehicle and surroundings on the basis of various information from the detection unit 131 and the self-position estimation unit 132. At this time, the situation recognition unit 153 of the situation analysis unit 133 also executes an environment map generation process described later with reference to a flowchart of FIG. 17 so as to also generate an environment map.

Further, the situation analysis unit 133 executes processes such as construction of a map including information necessary for autonomous driving processing, recognition of traffic rules around the own vehicle, and prediction of a situation regarding the own vehicle on the basis of various information, and the like, and outputs a processing result to the planning unit 134.

In step S4, the planning unit 134 generates an action plan on the basis of various information including the environment map supplied from the situation analysis unit 133, and outputs the generated action plan to the operation control unit 135.

In step S5, the operation control unit 135 controls the drive system control unit 107 to cause the drive system 108 to operate, and controls the body system control unit 109 to cause the body system 110 to operate, in order to implement operation of the vehicle on the basis of the action plan.

In step S6, the detection unit 131 determines whether or not an instruction on an end of operation is given by operating the input unit 101, for example, by operating a stop button, and when the instruction on the end is not given, the process returns to step S1. That is, the processes of steps S1 to S6 are repeated until the instruction on the end is given.

Then, in step S6, when it is determined that the instruction on the end is given, the process ends.

Through the above processes, autonomous driving of the vehicle 91 is achieved. Note that although the case where the mobile body is the vehicle 91 as illustrated in FIG. 5 has been described here, the mobile body may be another one, and may be, for example, the robot 191 illustrated in FIG. 6. However, since a basic process of autonomous traveling control by the autonomous traveling control unit 210 is similar to that of the flowchart of FIG. 16, the description thereof is omitted.

<Environment Map Generation Process>

Next, an environment map generation process by the situation recognition unit 153 (or 252) will be described with reference to a flowchart in FIG. 17. This process corresponds to the process in step S3 in the autonomous driving control process of FIG. 16.

In step S11, the image capture unit 301 captures (takes in) an image captured by the camera 11, and outputs the image to the semantic segmentation unit 302.

In step S12, the semantic segmentation unit 302 executes semantic segmentation on the supplied image as described with reference to FIG. 8 to classify the type to which a subject belongs for each pixel in the supplied image and give a semantic label (labeling) in units of pixels on the basis of a classification result, and outputs a labeling result in units of pixels to the image movable area boundary cost generation unit 303.

In step S13, the point cloud capture unit 306 captures (takes in) a distance image including the point cloud detected by the depth sensor 12, and outputs the distance image to the coordinate conversion unit 307.

In step S14, the coordinate conversion unit 307 converts each coordinate in the distance image including the point cloud information detected by the depth sensor 12 into the coordinate system of the camera 11 as described with reference to FIG. 9, and outputs the distance image to the environment map generation unit 305, the interpolation unit 308, and the depth movable area boundary cost generation unit 309.

In step S15, the interpolation unit 308 generates a distance image having a resolution similar to the resolution of the camera 11 by an interpolation process using distance information of each point of the distance image that has been coordinate-converted into the coordinate system of the camera 11, and outputs the distance image to the image movable area boundary cost generation unit 303.

In step S16, the image movable area boundary cost generation unit 303 generates an image movable area boundary cost on the basis of the semantic label of each pixel and the distance image generated by interpolation as described with reference to FIG. 12, and outputs the image movable area boundary cost to the movable area boundary estimation unit 304.

In step S17, the depth movable area boundary cost generation unit 309 generates a depth movable area boundary cost on the basis of the distance image as described with reference to FIGS. 10 and 11, and outputs the depth movable area boundary cost to the movable area boundary estimation unit 304.

In step S18, the movable area boundary estimation unit 304 estimates (determines) a movable area boundary by solving an optimization problem on the basis of the depth movable area boundary cost and the image movable area boundary cost as described with reference to FIG. 13, and outputs information of the movable area boundary that is an estimation result to the environment map generation unit 305.

In step S19, the environment map generation unit 305 generates and outputs an environment map on the basis of the information of the movable area boundary, as described with reference to FIGS. 14 and 15.

By the above processing, it is possible to determine the boundary of the movable area with high accuracy on the basis of the distance information between the semantic label and the distance image. Thus, it is possible to generate a highly accurate environment map, and it is possible to achieve appropriate autonomous driving.

That is, for a range where the distance is far, the boundary of the movable area is obtained on the basis of the information of the semantic label obtained on the basis of the image captured by the camera 11, and thus the boundary of the movable area can be obtained with higher accuracy than by using the distance image obtained by the depth sensor. In addition, for the range where the distance is near, the boundary of the movable area is obtained on the basis of the information of the semantic label obtained on the basis of the image captured by the camera 11 and the distance image, even in a subject or an imaging environment in which textures are similar and erroneous detection easily occurs in the semantic segmentation, it is possible to obtain the boundary of the movable area with high accuracy by considering the distance image.

2. Example Executed by Software

Incidentally, the series of processes described above can be executed by hardware, but can also be executed by software. In a case where the series of processes is executed by software, a program constituting the software is installed from a recording medium into, for example, a computer built into dedicated hardware or a general-purpose computer that is capable of executing various functions by installing various programs, or the like.

FIG. 18 illustrates a configuration example of a general-purpose computer. This computer includes a central processing unit (CPU) 1001. An input-output interface 1005 is connected to the CPU 1001 via a bus 1004. A read only memory (ROM) 1002 and a random access memory (RAM) 1003 are connected to the bus 1004.

To the input-output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and executes a communication process via a network represented by the Internet are connected. Furthermore, a drive 1010 that reads and writes data from and to a removable recording medium 1011 such as a magnetic disk (including a flexible disk), an optical disk (including a compact disc-read only memory (CD-ROM), a digital versatile disc (DVD)), a magneto-optical disk (including a Mini Disc (MD)), or a semiconductor memory is connected.

The CPU 1001 executes various processes according to a program stored in the ROM 1002 or a program that is read from the removable recording medium 1011 such as a magnetic disk, an optical disk, a magneto-optical disk, or a semiconductor memory, installed into the storage unit 1008, and then loaded from the storage unit 1008 to the RAM 1003. The RAM 1003 also appropriately stores data necessary for the CPU 1001 to execute various processes, and the like.

In the computer configured as described above, for example, the CPU 1001 loads the program stored in the storage unit 1008 into the RAM 1003 via the input-output interface 1005 and the bus 1004 and executes the program, to thereby perform the above-described series of processes.

The program executed by the computer (CPU 1001) can be provided by being recorded on, for example, a removable recording medium 1011 as a package medium or the like. Furthermore, the program can be provided via a wired or wireless transmission medium such as a local area network, the Internet, or digital satellite broadcasting.

In the computer, the program can be installed in the storage unit 1008 via the input-output interface 1005 by mounting the removable recording medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program for processing in time series in the order described in the present description, or a program for processing in parallel or at a necessary timing such as when a call is made.

Note that the CPU 1001 in FIG. 18 implements the functions of the autonomous driving control unit 112 in FIG. 5 and the autonomous traveling control unit 210 in FIG. 6. Furthermore, the storage unit 1008 in FIG. 18 implements the storage units 111 and 209 in FIGS. 5 and 6.

Furthermore, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that embodiments of the present disclosure are not limited to the above-described embodiments, and various modifications are possible without departing from the scope of the present disclosure.

For example, the present disclosure can have a configuration of cloud computing in which one function is shared by a plurality of devices via a network and processing is performed in cooperation.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

Note that the present disclosure can also have the following configurations.

<1> A signal processing device including:
  a labeling boundary estimation unit that estimates as a labeling information boundary, on the basis of labeling information according to a type of a subject in a captured image, an area in which a boundary of a movable area of a mobile body exists in the image;
  a distance image boundary estimation unit that estimates as a distance image boundary, on the basis of a distance image, an area in which the boundary of the movable area exists in the distance image; and
  a movable area boundary determination unit that determines the boundary of the movable area on the basis of the labeling information boundary and of the distance image boundary.

<2> The signal processing device according to <1>, in which
  the labeling boundary estimation unit estimates, as the labeling information boundary, an area in which a boundary of an area labeled as a subject of a type corresponding to the movable area exists on the basis of the labeling information.

<3> The signal processing device according to <1> or <2>, in which
  the labeling boundary estimation unit estimates the labeling information boundary on the basis of the labeling information and of the distance image.

<4> The signal processing device according to <3>, in which
  the labeling boundary estimation unit sets, on the basis of the labeling information, a boundary of an area labeled as a subject of a type corresponding to the movable area as the boundary of the movable area, and further estimates the boundary of the movable area as labeling information boundary by setting a vertical width of the boundary of the movable area set on the basis of the labeling information in accordance with a distance based on the distance image.

<5> The signal processing device according to <3>, in which
  the labeling boundary estimation unit sets, on the basis of the labeling information, a boundary of an area labeled as a subject of a type corresponding to the movable area as the boundary of the movable area, and further estimates the boundary of the movable area as labeling information boundary by setting a vertical width of the boundary of the movable area set on the basis of the labeling information in accordance with a distance based on the distance image.

<6> The signal processing device according to any one of <1> to <5>, in which the distance image boundary estimation unit estimates, as the distance image boundary, an area where a boundary between the movable area and an obstacle exists, based on the distance image.

<7> The signal processing device according to <6>, in which the distance image boundary estimation unit estimates, as the distance image boundary, the area where the boundary between the movable area and the obstacle exists, on the basis of distance information of each pixel in units of columns in every horizontal direction in the distance image.

<8> The signal processing device according to <7>, in which the distance image boundary estimation unit estimates, as the distance image boundary, the area where the boundary between the movable area and the obstacle exists, on the basis of a distribution in a height direction with respect to a distance direction, the distribution being of distance information of each pixel in units of columns in every horizontal direction in the distance image.

<9> The signal processing device according to <8>, in which the distance image boundary estimation unit estimates the distance image boundary, with respect to the distance information of each pixel in units of columns in every horizontal direction in the distance image, by setting, in the distribution in the height direction with respect to the distance direction, a distance where a distribution higher than a predetermined height corresponding to the movable area exists as the area where the boundary between the movable area and the obstacle exists.

<10> The signal processing device according to <8>, in which the distance image boundary estimation unit identifies the movable area by plane fitting on the basis of the distribution in the height direction with respect to the distance direction with respect to the distance information of each pixel in units of columns in every horizontal direction in the distance image, and estimates the distance image boundary by setting a distance where a distribution higher than the movable area identified by the plane fitting exists as the area where the boundary between the movable area and the obstacle exists.

<11> The signal processing device according to <8>, in which the distance image boundary estimation unit sets, with respect to the distance information of each pixel in units of columns in every horizontal direction in the distance image, an L-shaped function near the boundary between the movable area and the obstacle with respect to the distribution in the height direction with respect to the distance direction, and estimates the distance image boundary by setting a distance where a variation due to fitting with the L-shaped function according to the distance becomes minimum as the area where the boundary between the movable area and the obstacle exists.

<12> The signal processing device according to <8>, in which the distance image boundary estimation unit sets, with respect to the distance information of each pixel in units of columns in every horizontal direction in the distance image, a group including a plurality of adjacent distributions with respect to the distribution in the height direction with respect to the distance direction, obtains a normal of a plane based on distance information belonging to the group, and estimates the distance image boundary by setting a distance obtained from distance information to which a group in which the normal is near in a horizontal direction belongs as the area where the boundary between the movable area and the obstacle exists.

<13> The signal processing device according to any one of <1> to <12>, in which the labeling boundary estimation unit estimates, on the basis of the labeling information according to the type of the subject in the captured image, an area where the boundary of the movable area of the mobile body in the image exists as a labeling information boundary including a cost distribution according to a distance from an imaging position, the distance image boundary estimation unit estimates, on the basis of the distance image, an area where the boundary of the movable area in the distance image exists as a distance image boundary including a cost distribution according to a distance from a detection position of the distance image, and the movable area boundary determination unit determines the boundary of the movable area on the basis of an integrated cost distribution obtained by adding a cost distribution of the labeling information boundary and a cost distribution of the distance image boundary.

<14> The signal processing device according to any one of <1> to <13>, further including a labeling unit that generates labeling information by labeling in units of pixels according to the type of the subject in the captured image by semantic segmentation.

<15> The signal processing device according to any one of <1> to <14>, in which the movable area boundary determination unit determines the labeling information boundary as the boundary of the movable area in a case where a distance from the imaging position is farther than a predetermined distance, and determines the distance image boundary as the boundary of the movable area in a case where the distance from the imaging position is nearer than the predetermined distance.

<16> The signal processing device according to any one of <1> to <15>, further including a coordinate conversion unit that converts a coordinate system of one of the image and the distance image into a coordinate system of the other.

<17> The signal processing device according to any one of <1> to <16>, further including an interpolation unit that interpolates the distance information so that the distance image has a same resolution as the image on the basis of the distance information of the distance image, in which the labeling boundary estimation unit sets, on the basis of the labeling information, a boundary of an area labeled as a subject of a type corresponding to the movable area as the boundary of the movable area, and further estimates the boundary of the movable area as the labeling information boundary by setting a width in the vertical direction of the boundary of the movable area set on the basis of the labeling information, the setting according to a distance based on the distance image having a same resolution as the image by interpolation of the distance information by the interpolation unit.

<18> A signal processing method including:
a labeling boundary estimation process of estimating as a labeling information boundary, on the basis of labeling information according to a type of a subject in a captured image, an area in which a boundary of a movable area of a mobile body exists in the image;
a distance image boundary estimation process of estimating as a distance image boundary, on the basis of a distance image, an area in which the boundary of the movable area exists in the distance image; and
a movable area boundary determination process of determining the boundary of the movable area on the basis of the labeling information boundary and of the distance image boundary.

<19> A program that causes a computer to function as:
a labeling boundary estimation unit that estimates as a labeling information boundary, on the basis of labeling information according to a type of a subject in a captured image, an area in which a boundary of a movable area of a mobile body exists in the image;
a distance image boundary estimation unit that estimates as a distance image boundary, on the basis of a distance image, an area in which the boundary of the movable area exists in the distance image; and
a movable area boundary determination unit that determines the boundary of the movable area on the basis of the labeling information boundary and of the distance image boundary.

<20> A mobile body including:
a labeling boundary estimation unit that estimates as a labeling information boundary, on the basis of labeling information according to a type of a subject in a captured image, an area in which a boundary of a movable area of a mobile body exists in the image;
a distance image boundary estimation unit that estimates as a distance image boundary, on the basis of a distance image, an area in which the boundary of the movable area exists in the distance image;
a movable area boundary determination unit that determines the boundary of the movable area on the basis of the labeling information boundary and of the distance image boundary;
an environment mapping unit that generates an environment map on the basis of the boundary of the movable area determined by the movable area boundary determination unit;
a planning unit that generates an action plan on the basis of the environment map; and
a control unit that controls the operation of the mobile body on the basis of the generated action plan.

REFERENCE SINGS LIST

91 Vehicle
100 Vehicle control system
102 Data obtaining unit
112 Autonomous driving control unit
133 Situation analysis unit
153 Situation recognition unit
191 Robot
200 Robot control system
202 Data obtaining unit
210 Autonomous traveling control unit
233 Situation analysis unit
252 Situation recognition unit
301 Image capture unit
302 Semantic segmentation unit
303 Image movable area boundary cost generation unit
304 Movable area boundary estimation unit
305 Environment mapping unit
306 Point cloud capture unit
307 Coordinate conversion unit
308 Interpolation unit
309 Depth movable area boundary cost generation unit

The invention claimed is:

1. A signal processing device comprising:
processing circuitry configured to:
estimate as a labeling information boundary, based on labeling information that corresponds to a type of a subject in a captured image, an area in which a boundary of a movable area of a mobile body exists in the captured image;
estimate as a distance image boundary, based on a distance image, an area in which the boundary of the movable area of the mobile body exists in the distance image; and
determine a final boundary of the movable area based on the labeling information boundary and the distance image boundary,
wherein the processing circuitry is configured to estimate the labeling information boundary based on the labeling information and the distance image by:
setting, based on the labeling information, a boundary of an area labeled as a subject of a type corresponding to the movable area as the boundary of the movable area, and
further estimating the boundary of the movable area as labeling information boundary by setting a vertical width of the boundary of the movable area set on a basis of the labeling information in accordance with a distance based on the distance image.

2. The signal processing device according to claim 1, wherein
the processing circuitry is configured to estimate, as the distance image boundary, an area where a boundary between the movable area and an obstacle exists, based on the distance image.

3. The signal processing device according to claim 2, wherein
the processing circuitry is configured, as the distance image boundary, the area where the boundary between the movable area and the obstacle exists, based on distance information of each pixel in units of columns in every horizontal direction in the distance image.

4. The signal processing device according to claim 3, wherein
the processing circuitry is configured to estimate, as the distance image boundary, the area where the boundary between the movable area and the obstacle exists, based on a distribution in a height direction with respect to a distance direction, the distribution in the height direction being a distribution of distance information of each pixel in units of columns in every horizontal direction in the distance image.

5. The signal processing device according to claim 4, wherein
the processing circuitry is configured to estimate the distance image boundary, with respect to the distance information of each pixel in units of columns in every horizontal direction in the distance image, by setting, in the distribution in the height direction with respect to the distance direction, a distance where a distribution higher than a predetermined height corresponding to the movable area exists as the area where the boundary between the movable area and the obstacle exists.

6. The signal processing device according to claim 4, wherein
the processing circuitry is configured to:
identify the movable area by plane fitting based on the distribution in the height direction with respect to the distance direction with respect to the distance information of each pixel in units of columns in every horizontal direction in the distance image, and
estimate the distance image boundary by setting a distance where a distribution higher than the movable area identified by the plane fitting exists as the area where the boundary between the movable area and the obstacle exists.

7. The signal processing device according to claim 4, wherein
the processing circuitry is configured to:
set, with respect to the distance information of each pixel in units of columns in every horizontal direction in the distance image, an L-shaped function near the boundary between the movable area and the obstacle with respect to the distribution in the height direction with respect to the distance direction, and
estimate the distance image boundary by setting a distance where a variation due to fitting with the L-shaped function according to the distance becomes minimum as the area where the boundary between the movable area and the obstacle exists.

8. The signal processing device according to claim 4, wherein
the processing circuitry is configured to:
set, with respect to the distance information of each pixel in units of columns in every horizontal direction in the distance image, a group including a plurality of adjacent distributions with respect to the distribution in the height direction with respect to the distance direction,
obtain a normal of a plane based on distance information belonging to the group, and
estimate the distance image boundary by setting a distance obtained from distance information to which a group in which the normal is near in a horizontal direction belongs as the area where the boundary between the movable area and the obstacle exists.

9. The signal processing device according to claim 1, wherein
the processing circuitry is configured to:
estimate, based on the labeling information according to the type of the subject in the captured image, an area where the boundary of the movable area of the mobile body in the captured image exists as a labeling information boundary including a cost distribution according to a distance from an imaging position,
estimate, based on the distance image, an area where the boundary of the movable area in the distance image exists as a distance image boundary including a cost distribution according to a distance from a detection position of the distance image, and
determine the boundary of the movable area based on an integrated cost distribution obtained by adding a cost distribution of the labeling information boundary and a cost distribution of the distance image boundary.

10. The signal processing device according to claim 1, wherein:

the processing circuitry is configured to generate labeling information by labeling in units of pixels according to the type of the subject in the captured image by semantic segmentation.

11. The signal processing device according to claim 1, wherein
the processing circuitry is configured to:
determine the labeling information boundary as the boundary of the movable area in a case where a distance from the imaging position is farther than a predetermined distance, and
determine the distance image boundary as the boundary of the movable area in a case where the distance from the imaging position is nearer than the predetermined distance.

12. The signal processing device according to claim 1, wherein:
the processing circuitry is configured to convert a coordinate system of one of the captured image or the distance image into a coordinate system of the other.

13. The signal processing device according to claim 1, wherein:
the processing circuitry is configured to:
interpolate the distance information so that the distance image has a same resolution as the captured image based on the distance information of the distance image,
set, based on the labeling information, a boundary of an area labeled as a subject of a type corresponding to the movable area as the boundary of the movable area, and
further estimate the boundary of the movable area as the labeling information boundary by setting a width in the vertical direction of the boundary of the movable area set based on the labeling information, the setting according to a distance based on the distance image having a same resolution as the captured image by interpolation of the distance information by the processing circuitry.

14. A signal processing method performed by a processor of a signal processing device, the method comprising:
estimating as a labeling information boundary, based on labeling information according to a type of a subject in a captured image, an area in which a boundary of a movable area of a mobile body exists in the captured image;
estimating as a distance image boundary, based on a distance image, an area in which the boundary of the movable area exists in the distance image; and
determining the boundary of the movable area based on the labeling information boundary and the distance image boundary,
wherein the labeling information boundary is estimated based on the labeling information and the distance image by;
setting, based on the labeling information, a boundary of an area labeled as a subject of a type corresponding to the movable area as the boundary of the movable area, and
further estimating the boundary of the movable area as labeling information boundary by setting a vertical width of the boundary of the movable area set on a basis of the labeling information in accordance with a distance based on the distance image.

15. A non-transitory computer readable medium containing a program that causes a computer to perform a method comprising:

estimating as a labeling information boundary, based on labeling information according to a type of a subject in a captured image, an area in which a boundary of a movable area of a mobile body exists in the captured image;

estimating as a distance image boundary, based on a distance image, an area in which the boundary of the movable area exists in the distance image; and determining the boundary of the movable area based on the labeling information boundary and the distance image boundary, wherein the labeling information boundary is estimated based on the labeling information and the distance image by:

setting, based on the labeling information, a boundary of an area labeled as a subject of a type corresponding to the movable area as the boundary of the movable area, and further estimating the boundary of the movable area as labeling information boundary by setting a vertical width of the boundary of the movable area set on a basis of the labeling information in accordance with a distance based on the distance image.

* * * * *